United States Patent
Paver et al.

(10) Patent No.: US 8,131,981 B2
(45) Date of Patent: Mar. 6, 2012

(54) SIMD PROCESSOR PERFORMING FRACTIONAL MULTIPLY OPERATION WITH SATURATION HISTORY DATA PROCESSING TO GENERATE CONDITION CODE FLAGS

(75) Inventors: Nigel C. Paver, Austin, TX (US); Bradley C. Aldrich, Austin, TX (US)

(73) Assignee: Marvell International Ltd., Hamilton (BM)

( * ) Notice: Subject to any disclaimer, the term of this patent is extended or adjusted under 35 U.S.C. 154(b) by 66 days.

(21) Appl. No.: 12/539,944

(22) Filed: Aug. 12, 2009

(65) Prior Publication Data

US 2009/0300325 A1 Dec. 3, 2009

Related U.S. Application Data

(63) Continuation of application No. 12/149,429, filed on May 1, 2008, now abandoned, which is a continuation of application No. 11/797,067, filed on Apr. 30, 2007, now Pat. No. 7,373,488, which is a continuation of application No. 10/262,195, filed on Sep. 30, 2002, now Pat. No. 7,213,128, which is a continuation-in-part of application No. 10/215,756, filed on Aug. 9, 2002, now Pat. No. 6,986,023.

(51) Int. Cl.
G06F 9/302 (2006.01)

(52) U.S. Cl. .................. 712/222; 712/7; 712/22

(58) Field of Classification Search .......... None
See application file for complete search history.

(56) References Cited

U.S. PATENT DOCUMENTS

| | | |
|---|---|---|
| 4,750,110 A | 6/1988 | Mothersole et al. |
| 4,873,630 A | 10/1989 | Rusterholz et al. |
| 4,894,768 A | 1/1990 | Iwasaki et al. |
| 5,073,864 A | 12/1991 | Methvin et al. |
| 5,125,095 A | 6/1992 | Nakazawa et al. |
| 5,420,809 A | 5/1995 | Read et al. |
| 5,420,989 A | 5/1995 | Maher et al. |
| 5,696,985 A | 12/1997 | Crump et al. |
| 5,721,892 A | 2/1998 | Peleg et al. |
| 5,734,874 A | 3/1998 | Van Hook et al. |
| 5,802,336 A | 9/1998 | Peleg et al. |
| 5,805,875 A | 9/1998 | Asanovic |
| 5,815,715 A | 9/1998 | Kuçukçakar |
| 5,822,619 A | 10/1998 | Sidwell |
| 5,838,984 A | 11/1998 | Nguyen et al. |
| 5,893,066 A | 4/1999 | Hong |
| 5,915,109 A | 6/1999 | Nakakimura et al. |

(Continued)

FOREIGN PATENT DOCUMENTS

EP 0 680 013 A2 11/1995

(Continued)

OTHER PUBLICATIONS

Apr. 27, 2010 Office Action issue in Japanese Patent Application No. 2004-527842 (with translation).

(Continued)

*Primary Examiner* — Kenneth Kim

(57) ABSTRACT

A data processing system, apparatus and method for performing fractional multiply operations is disclosed. The system includes a memory that stores instructions for SIMD operations and a processing core. The processing core includes registers that store operands for the fractional multiply operations. A coprocessor included in the processing core performs the fractional multiply operations on the operands and stores the result in a destination register that is also included in the processing core.

19 Claims, 14 Drawing Sheets

U.S. PATENT DOCUMENTS

| | | | |
|---|---|---|---|
| 5,923,893 | A | 7/1999 | Moyer et al. |
| 5,930,519 | A | 7/1999 | Krech, Jr. |
| 5,933,650 | A | 8/1999 | Van Hook et al. |
| 5,936,872 | A | 8/1999 | Fischer et al. |
| 5,938,759 | A * | 8/1999 | Kamijo .................. 712/209 |
| 5,996,057 | A | 11/1999 | Scales et al. |
| 6,006,315 | A | 12/1999 | Park |
| 6,016,395 | A * | 1/2000 | Mohamed ................. 717/149 |
| 6,178,500 | B1 * | 1/2001 | Roth ..................... 712/300 |
| 6,247,113 | B1 | 6/2001 | Jaggar |
| 6,282,633 | B1 | 8/2001 | Killian et al. |
| 6,298,438 | B1 | 10/2001 | Thayer et al. |
| 6,332,186 | B1 | 12/2001 | Elwood et al. |
| 6,385,634 | B1 * | 5/2002 | Peleg et al. ............... 708/490 |
| 6,430,684 | B1 | 8/2002 | Bosshart |
| 6,502,117 | B2 | 12/2002 | Golliver et al. |
| 6,529,930 | B1 | 3/2003 | Sazzad et al. |
| 6,530,012 | B1 | 3/2003 | Wilson |
| 6,546,480 | B1 | 4/2003 | Mandavilli et al. |
| 6,550,000 | B1 | 4/2003 | Minematsu et al. |
| 6,671,797 | B1 | 12/2003 | Golston |
| 6,748,521 | B1 * | 6/2004 | Hoyle ..................... 712/221 |
| 6,754,804 | B1 | 6/2004 | Hudepohl et al. |
| 6,757,820 | B2 | 6/2004 | Sudharsanan et al. |
| 6,829,697 | B1 | 12/2004 | Davis et al. |
| 6,865,663 | B2 | 3/2005 | Barry |
| 6,889,242 | B1 * | 5/2005 | Sijstermans et al. ......... 708/551 |
| 7,020,873 | B2 | 3/2006 | Bik et al. |
| 7,065,546 | B2 * | 6/2006 | Auyeung et al. ........... 708/650 |
| 7,228,401 | B2 | 6/2007 | Moyer |
| 7,689,641 | B2 * | 3/2010 | Abel et al. ............... 708/620 |
| 2002/0065860 | A1 * | 5/2002 | Grisenthwaite et al. ...... 708/207 |
| 2002/0083311 | A1 | 6/2002 | Paver |
| 2003/0120903 | A1 | 6/2003 | Roussel |
| 2003/0167460 | A1 | 9/2003 | Desai et al. |
| 2003/0204819 | A1 | 10/2003 | Matsumoto et al. |
| 2003/0221089 | A1 | 11/2003 | Spracklen |
| 2004/0073773 | A1 | 4/2004 | Demjanenko |

FOREIGN PATENT DOCUMENTS

| | | |
|---|---|---|
| JP | A-62-214464 | 9/1987 |
| JP | A-08-044880 | 2/1996 |
| JP | A-11-511575 | 10/1999 |
| JP | A-11-353305 | 12/1999 |
| JP | A-2001-134436 | 5/2001 |
| JP | A-2005-535966 | 11/2005 |
| WO | WO 97/08608 | 3/1997 |
| WO | WO 99/61996 | 12/1999 |
| WO | WO 00/43868 | 7/2000 |

OTHER PUBLICATIONS

U.S. Appl. No. 10/263,246, filed Oct. 2002, Paver et al.

AMD Inc., AMD Extensions to the 3Dnow!(tm) and MMX(tm) Instructions Sets Manual, Mar. 2000, 22466D/0., AMD Inc., Santa Clara, CA USA.

ARM Ltd., ARM Instruction Set Quick Reference Card, Oct. 1999; Arm QRC 0001D, ARM Ltd., Cambridge, UK.

Brash, D., The ARM Architecture Version 6 (ARMv6), Jan. 2002, ARM White Paper, ARM Ltd., Cambridge UK.

Lewis, A., MPEG-4 Over Wireless Networks, 2000, ARM White Paper, ARM Ltd., Cambridge UK.

Wragg, B & Carpenter, P., An Optimised Software Solution for an Arm Powered(tm) MP# Decoder, Oct. 2000, ARM White Paper, ARM Ltd., Cambridge UK.

R.B. Garner et al., *The Scalable Processor Architecture (SPARC)*, Intellectual Leverage, San Francisco, Feb. 29-Mar. 4, 1988, Computer Society International Conference Washington, IEEE Comp. Soc. Press, US, vol. Conf. 33, Feb. 29, 1988, pp. 278-283.

Derby, J. et al. "A High-Performance Embedded DSP Core with Novel SIMD Features." ICASSP, IEEE 0-7803-7663-3, 2003.

Lerner, Boris. "Parallel Implementation of Fixed-Point FFT's on TigerSHARC® Processors, Analog Devices." EE-263, rev 1, Feb. 3, 2005.

Ikei, Mitsuru. "Basic of IA-64 Processor." Published from Ohmsha Corporation on Aug. 25, 2000., pp. 150, 160 and 161.

Decision of Appeal issued in Appeal No. 2008-15806, dated Oct. 12, 2010 with English Translation.

* cited by examiner

SIMD PROCESSOR PERFORMING FRACTIONAL MULTIPLY OPERATION WITH SATURATION HISTORY DATA PROCESSING TO GENERATE CONDITION CODE FLAGS

RELATED APPLICATIONS

This is a Continuation of application Ser. No. 12/149,429, filed May 1, 2008, which in turn is a Continuation of U.S. Pat. No. 7,373,488, which issued on May 13, 2008, which in turn is a Continuation of U.S. Pat. No. 7,213,128, which issued on May 1, 2007, which in turn is a Continuation-in-part of U.S. Pat. No. 6,986,023, which issued on Jan. 10, 2006 and claims the benefit of U.S. Provisional Application No. 60/409,624 filed on Sep. 10, 2002. The entire disclosure of the prior applications are hereby incorporated by reference herein in their entirety.

FIELD OF THE DISCLOSURE

This disclosure relates generally to the field of processors. In particular, the disclosure relates to calculation and storage of Single-Instruction-Multiple-Data (SIMD) saturation history information.

BACKGROUND

It is known to provide data processing systems incorporating both main processors and a coprocessor. In some systems it is known to be able to provide one or more different coprocessors with a main processor. In this case, the different coprocessors can be distinguished by different coprocessor numbers.

A coprocessor instruction encountered in the instruction data stream of the main processor is issued on a bus coupled to the coprocessor. The one or more coprocessors (that each have an associated hardwired coprocessor number) attached to the bus examine the coprocessor number field of the instruction to determine whether or not they are the target coprocessor for that instruction. If they are the target coprocessor, then they issue an accept signal to the main processor. If the main processor does not receive an accept signal, then it can enter an exception state to deal with the undefined instruction.

One type of instruction may perform operations on packed data. Such instructions may be referred to as Single-Instruction-Multiple-Data (SIMD) instructions. One set of SIMD instructions was defined for the Pentium® Processor with MMX™ Technology by Intel® Corporation and described in "IA-32 Intel Architecture Software Developer's Manual Volume 2: Instruction Set Reference," which is available online from Intel Corporation, Santa Clara, Calif. at www.intel.com/design/litcentr.

Some SIMD instructions perform saturating operations on packed data, in which results of an operation, with saturate enabled, may be clamped when they overflow or underflow the range of the data by setting any results to a maximum or minimum value when they exceed the range's maximum or minimum value. Following the execution of such instructions it is not readily apparent if any results were actually saturated.

For some applications, it may be desirable to detect if and where saturation has occurred in such SIMD operations and to take action based upon the detection of said saturation.

BRIEF DESCRIPTION OF THE DRAWINGS

The present invention is illustrated by way of example and not limitation in the figures of the accompanying drawings.

DETAILED DESCRIPTION OF THE EMBODIMENTS

Disclosed herein is a process and apparatus for calculating and storing Single-Instruction-Multiple-Data (SIMD) saturation history information. A coprocessor instruction has a format identifying a saturating operation, a first source having packed data elements and a second source having packed data elements. The saturating operation is executed on the packed data elements of the first and second sources. One embodiment of saturation flags are stored at least in part in bits zero through seven of a Wireless Coprocessor Saturation Status Flag (wCSSF) register to indicate if a result of the saturating operation saturated.

These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention measured only in terms of the claims and their equivalents.

For the purpose of the following discussion of embodiments of the present invention, illustrative terms are used. Definitions for certain such illustrative terms follows.

A data processing device or system may be understood to mean any one of a variety of devices or systems for accessing data and/or communications. Examples include but are not limited to any combinations of one or more of the following: laptop computers, notebook computers; desktop computers, personal digital assistants, handheld computers, personal organizers; palmtop computers, pocket computers, cellular telephone/fax devices, game computers, digitizing tablet devices, electronic books, or digital audio recorder/players.

A register is any device capable of storing and providing data. Further functionality of a register with respect to data formats is described below. A register is not necessarily, included on the same die or in the same package as the processor.

A wireless device or interface may be understood to mean any one of a variety of devices or interfaces for wireless communications. Examples include but are not limited to any combination of devices for one or more of the following: short-range radio, satellite communications, wireless local area networks, wireless telephony, cellular digital packet data, home radio frequency, narrowband time-division multiple access, code-division multiple access, wideband code-division multiple access, wireless fidelity or short message service.

It will be appreciated that the invention may be modified in arrangement and detail by those skilled in the art without departing from the principles of the present invention within the scope of the accompanying claims and their equivalents.

Figure 1:
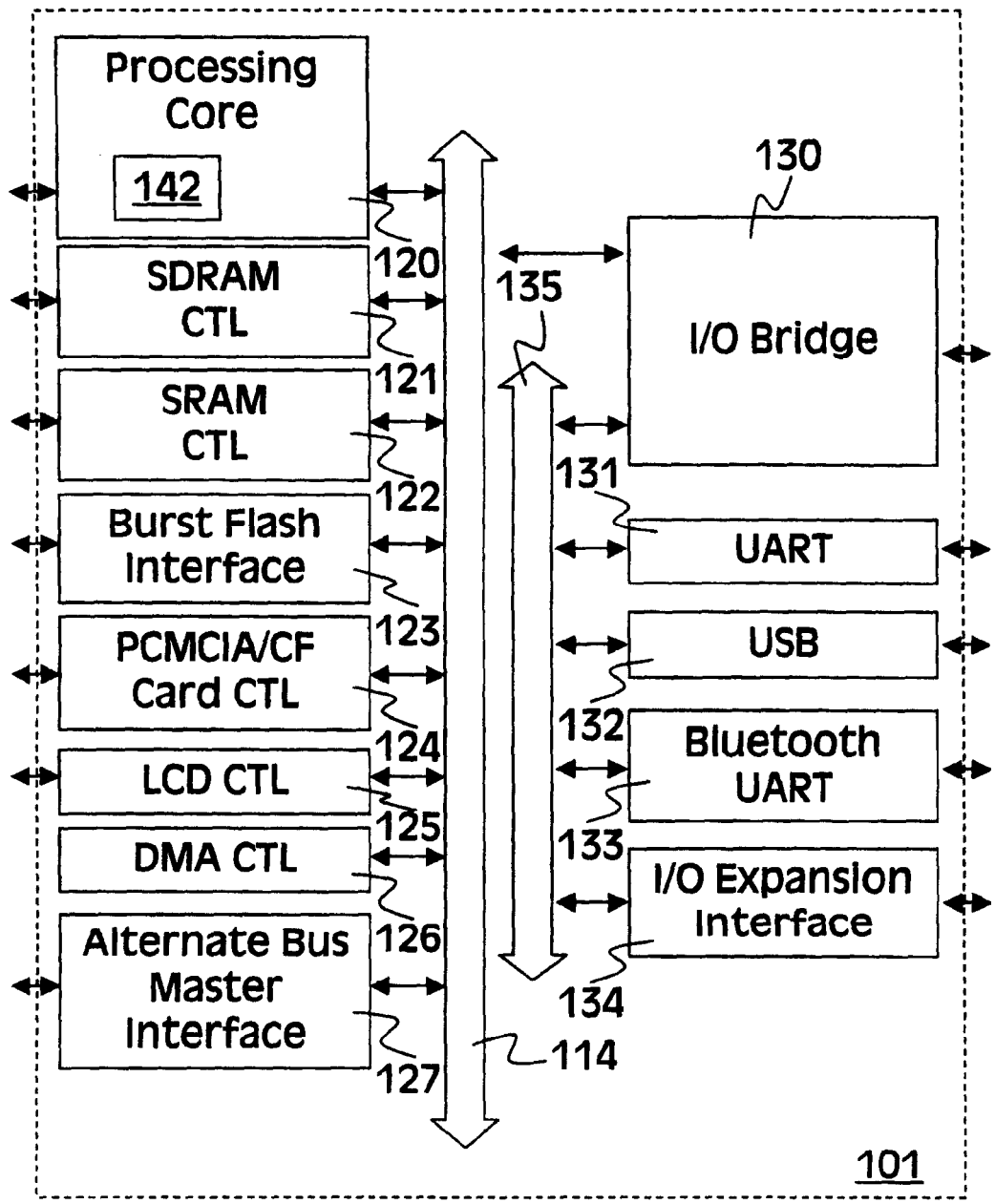
FIG. 1 illustrates one embodiment of a data processing system capable of storing SIMD saturation history.

Turning now to FIG. 1, one embodiment of a data processing system 101 capable of storing SIMD saturation history is illustrated. One embodiment of data processing system 101 is an Intel®. Personal Internet Client Architecture (Intel® PCA) applications processors with Intel XScale™ technology (as described on the world-wide web at developer.intel.com). It will be readily appreciated by one of skill in the art that the embodiments described herein can be used with alternative processing systems without departure from the scope of the invention.

Data processing system 101 comprises a processing core 120 capable of performing SIMD operations and storing SIMD saturation history. For one embodiment of processing core 120, a register file 142 provides storage locations for storing SIMD saturation history. Processing core 120 is coupled with bus 114 for communicating with various other system devices, which may include but are not limited to, for example, synchronous dynamic random access memory (SDRAM) control 121, static random access memory (SRAM) control, burst flash memory interface 123, personal computer memory card international association (PCMCIA)/compact flash (CF) card control 124, liquid crystal display (LCD) control 125, direct memory access (DMA) controller 126, and alternative bus master interface 127.

In one embodiment, data processing system 101 may also comprise an I/O bridge 130 for communicating with various I/O devices via an I/O bus 135. Such I/O devices may include but are not limited to, for example, universal asynchronous receiver/transmitter (UART) 131, universal serial bus (USB) 132, Bluetooth wireless UART 133 and I/O expansion interface 134.

One embodiment of data processing system 101 provides for mobile, network and/or wireless communications and a processing core 120 capable of performing SIMD operations and storing SIMD saturation history. Processing core 120 may be programmed with various audio, video, imaging and communications algorithms. It will be appreciated that these algorithms may include digital signal processing (DSP) building blocks, which may benefit from SIMD operations, such as: convolutions; auto-correlation functions (ACF) or cross-correlation functions (CCF); digital filters such as finite impulse response filters (FIR), adaptive filters (AF) which include, for example, least mean squared (LMS) error algorithms for echo cancellation, or infinite impulse response filters (IIR); discrete transformations such as a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

It will also be appreciated that such DSP building block algorithms may be designed to process fixed-point data in a SIMD fashion. Since fixed-point data has a more limited dynamic range than floating-point data, such algorithms may make use of saturation to avoid worst case wrap-around effects. For some applications, trade-offs may be made between higher quality results for average case data and worst case wrap-around results. In applications such as these and in other applications, detection of saturation history may provide for greater flexibility, for example, providing higher quality for the average case and detecting saturation to make adjustments in the algorithm for the worst case.

Figure 2:
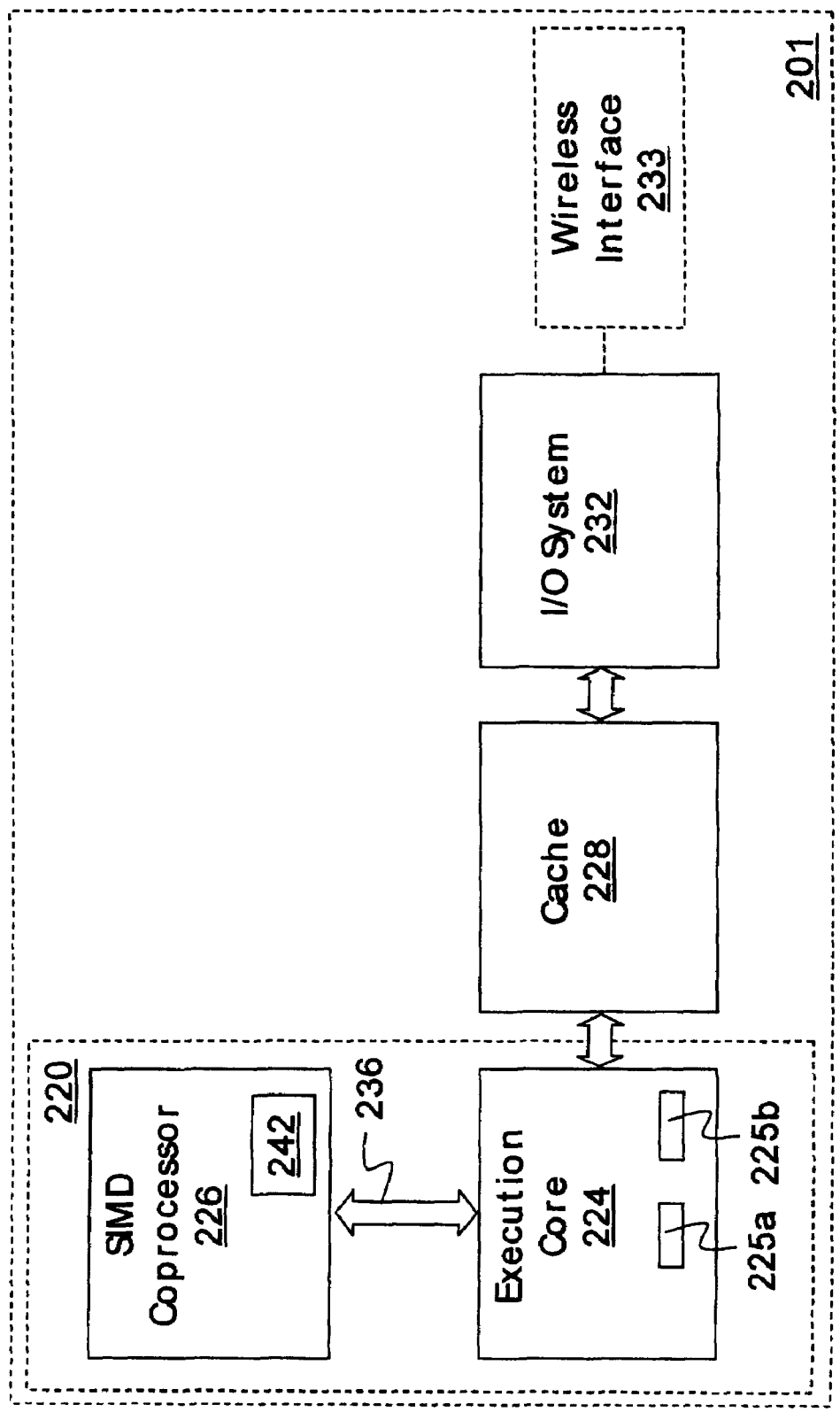
FIG. 2 illustrates alternative embodiments of a data processing system capable of storing SIMD saturation history.

FIG. 2 illustrates alternative embodiments of a data processing system capable of storing SIMD saturation history. In accordance with one alternative embodiment, data processing system 201 may include a main processor 224, a multimedia coprocessor 226, a cache memory 228 and an input/output system 232. The input/output system 232 may optionally be coupled to a wireless interface 233. Multimedia coprocessor 226 is capable of performing SIMD operations and storing SIMD saturation history. For one embodiment of multimedia coprocessor 226, a register file 242 provides storage locations for storing SIMD saturation history.

In operation, the main processor 224 executes a stream of data processing instructions that control data processing operations of a general type including interactions with the cache memory 228, and the input/output system 232. Embedded within the stream of data processing instructions are coprocessor instructions. The main processor 224 recognizes these coprocessor instructions as being of a type that should be executed by an attached coprocessor 226. Accordingly, the main processor 224 issues these coprocessor instructions on the coprocessor bus 236 from where they are received by any attached coprocessors. In this case, the coprocessor 226 will accept and execute any received coprocessor instructions that it detects are intended for it. This detection is via the combination of a coprocessor number field and valid instruction encoding for the designated coprocessor, within the coprocessor instruction.

Data may be received via wireless interface 233 for processing by the coprocessor instructions. For one example, voice communication may be received in the form of a digital signal, which may be processed by the coprocessor instructions to regenerate digital audio samples representative of the voice communications. For another example, compressed audio and/or video may be received in the form of a digital bit stream, which may be processed by the coprocessor instructions to regenerate digital audio samples and/or motion video frames.

In accordance with another alternative embodiment, data processing system 201 may include a processing core 220, a cache memory 228 and an input/output system 232. The input/output system 232 may optionally be coupled to a wireless interface 233. Processing core 220 is capable of performing SIMD operations and storing SIMD saturation history. For one embodiment of processing core 220, an execution core 224 and a SIMD coprocessor are integrated into a single processing core 220 comprising a register file 242 to provide storage locations for storing SIMD saturation history.

For one embodiment of processing core 220, instructions can be conditionally executed. Conditionally executed includes instructions that have an associated condition that is checked by determining if flags 225a and 225b match the condition associated with the instruction.

Figure 3:
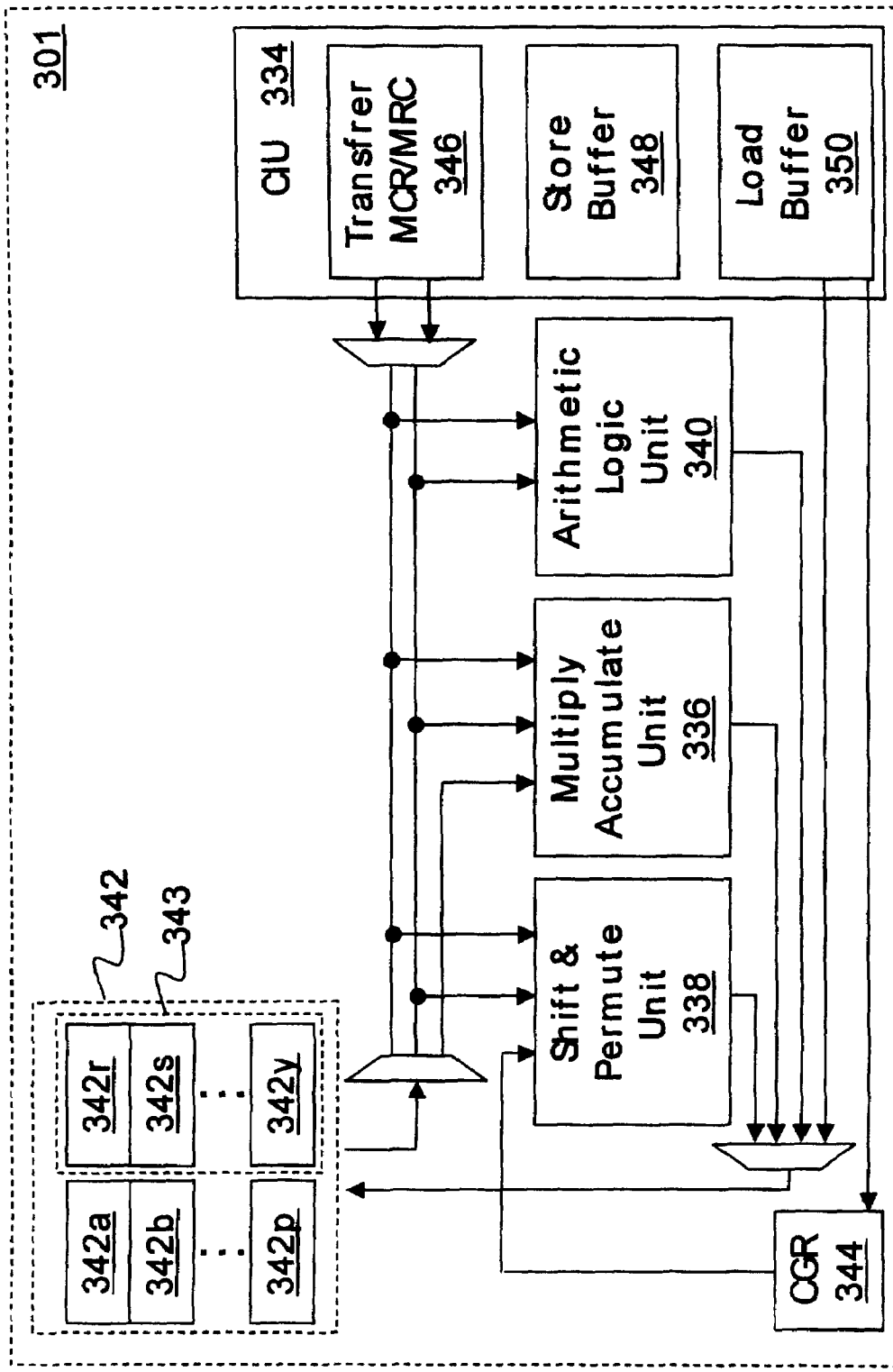
FIG. 3 illustrates one embodiment of a coprocessor capable of storing SIMD saturation history.

Referring to FIG. 3, one embodiment of a multimedia coprocessor 301 may include a coprocessor interface unit (CIU) 334 including a transfer buffer 346. The transfer buffer 346 may facilitate transfers to a coprocessor register (MCR) and transfers from a coprocessor (MRC). In one embodiment, as shown, the CIU 334 may detect and/or identify coprocessor instructions intended for multimedia coprocessor 301. The CIU 334 may also include a store buffer 348 and a load buffer 350. The CIU 334 communicates with a multiply accumulate unit 336, a shift and permute unit 338, and an arithmetic logic unit (ALU) 340. The CGR 344 contains auxiliary registers. A plurality of multiplexers (MUX) facilitate the data transfer between various units.

Register file (RF) unit 342 may include a plurality of registers. One embodiment of RF unit 342 includes sixteen data registers 342a-342p and eight status and control registers 342r-342y. For one alternative embodiment of RF unit 342, the data registers comprise 64 bits of data and the status and control registers comprise 32 bits of data. For another alternative embodiment of RF unit 342, the data registers comprise 128 bits of data to provide for wider SIMD operations and the status and/or control registers comprise 64 or more bits of data.

In on embodiment of coprocessor 301 instructions, up to three registers may be assigned. For one embodiment of coprocessor 301, up to two source registers and one destination register may be assigned to an instruction. For an alternative embodiment of coprocessor 301, one or more source registers and/or a destination register may be implicit to an instruction. A primary source register may be designated wRn, a secondary source register may be designated wRm, and a destination register may be designated wRd in accordance with one embodiment of coprocessor 301.

Figures 4, 5, 6, 7:
FIG. 4 is a depiction of an operation encoding (opcode) format for a coprocessor instruction.
FIG. 5 is a depiction of an alternative operation encoding (opcode) format for a coprocessor instruction.
FIG. 6 is a depiction of two alternative registers for storing arithmetic status flags.
FIG. 7 illustrates one embodiment of a register for storing SIMD saturation history.

Turning next to FIG. 4, in some alternative embodiments, 64 bit single instruction multiple data (SIMD) arithmetic operations may be performed through a coprocessor data processing (CDP) instruction. Operation encoding (opcode) format 401 depicts one such CDP instruction having CDP opcode fields 411 and 418. The type of CDP instruction, for alternative embodiments of SIMD arithmetic operations, may be encoded by one or more of fields 412, 413, 416 and 417. Three operands per instruction may be used, including up to two source 414 and 419 operands and one destination 415 operand. The coprocessor can operate on 8, 16, 32, and 64 bit values and instructions may be executed conditionally, in some embodiments, using condition field 410. For some instructions source data sizes may be encoded by field 412.

In some cases, multiplication, addition and subtraction can be performed, as well as addition with carry. Zero (Z), negative (N), carry (C), and overflow (V) detection can be done on SIMD fields. Also, signed saturation or unsigned saturation to the SIMD field width can be performed for some operations. For instructions in which saturation is enabled, saturation detection can be done on SIMD fields. For some instructions, the type of saturation may be encoded by field 413. For other instructions, the type of saturation may be fixed.

FIG. 5 is a depiction of an alternative operation encoding (opcode) format 501 for a coprocessor instruction. Opcode format 501 depicts a move from coprocessor (MRC) instruction or a move to coprocessor (MCR) instruction having MRC and MCR opcode fields 511, 513 and 518. The type of MRC or MCR instruction may be encoded by one or more of fields 512, 513, 516 and 517, field 513 distinguishing between an MRC or an MCR instruction. Up to three operands per instruction may be used, including up to two source 514 and 519 operands and one destination 515 operand. In alternative embodiments, the coprocessor can transfer 1-8, 16, 32, and/or 64 bit values. For some instructions source data sizes may be encoded by field 512. For other instructions source data sizes may be encoded by field 517. For some instructions source field 512 may encode what type of arithmetic or saturation flags to transfer and/or combine. Instructions may also be executed conditionally, in some embodiments, using condition field 510.

One alternative operation encoding (opcode) format corresponds with the general integer opcode format, having twenty-four, thirty-two or more bits, described in the "IA-32 Intel Architecture Software Developer's Manual Volume 2: Instruction Set Reference," which is available online from Intel Corporation, Santa Clara, Calif. at www.intel.com/design/litcentr. It will be appreciated that one or more of fields 412, 413, 416 and 417 may all be combined into one large opcode field comprising bits six through twenty-three or bits six through thirty-one of this format. For some instructions, bits three through five are to identify a first source operand address. In one embodiment, where there is a first source operand address, then bits three through five also correspond to the destination operand address. Bits zero through two may identify a second source operand address. In an alternate embodiment, where bits zero through two identify a second source operand address, then bits zero through two also correspond to the destination operand address. For other instructions, bits three through five represent an extension to the opcode field. In one embodiment, this extension allows a programmer to include an immediate value with the control signal, such as a shift count value. In one embodiment, the immediate value follows the control signal. This general format allows register to register, memory to register, register by memory, register by register, register by immediate, register to memory addressing. Also, in one embodiment, this general format can support integer register to register, and register to integer register addressing.

FIG. 6 is a depiction of two alternative registers, wireless coprocessor arithmetic status flags (wCASF) register 601 and current program status register (CPSR) 602 for storing arithmetic status flags. One embodiment of wCASF register 601 comprises, SIMD fields 610-617, each storing a set 620 of arithmetic flags to indicate negative (N) zero (Z) carry out (C) and overflow (V). For one alternative embodiment of wCASF register 601, each of SIMD fields 610-617 includes a flag to indicate saturation history. CPSR 602 comprises mode field 633, control field 632, reserved field 631 and condition code flags set 630. Condition code flags set 630 indicate negative (N) zero (Z) carry out (C) overflow (V) and optionally saturation (Q).

FIG. 7 illustrates one embodiment of a wireless coprocessor saturation status flags (wCSSF) register 701 for storing SIMD saturation history. One embodiment of wCSSF register 701 comprises reserved field 718 and SIMD fields 710-717, each storing saturation history according to whether saturation has occurred at a particular byte, half word or word position. For one alternative embodiment of wCSSF register 701, reserved field 718 comprises SIMD fields for storing saturation history of packed data in a most significant double word.

For one embodiment of wCSSF register 701, saturation history stored in SIMD fields 710-717 is sticky. That is to say SIMD fields 710-717 remain set until explicitly cleared, for example, by reset or by writing to the wCSSF register 701. For one alternative embodiment of wCSSF register 701, saturation history stored in SIMD fields 710-717 is not sticky and zero is written to SIMD fields 710-717 according to whether saturation has not occurred in an operation at a particular byte, half word or word position. For another alternative embodiment of wCSSF register 701, reserved field 718 comprises SIMD fields for storing saturation history of packed data that is not sticky. For one alternative embodiment of wCSSF register 701, saturation history stored in lower unused SIMD fields 710-717 is not cleared to zero for 16- or 32-bit SIMD operations when saturation occurs at a particular half word or word position.

For one embodiment of wCSSF register 701: saturation history stored in SIMD field 717 indicates saturation for byte 7, half word 3, word 1, or double word 0; saturation history stored in SIMD field 716 indicates saturation for byte 6; saturation history stored in SIMD field 715 indicates saturation for byte 5 or half word 2; saturation history stored in SIMD field 714 indicates saturation for byte 4; saturation history stored in SIMD field 713 indicates saturation for byte 3, half word 1 or word 0; saturation history stored in SIMD field 712 indicates saturation for byte 2; saturation history stored in SIMD field 711 indicates saturation for byte 1 or half word 0; and saturation history stored in SIMD field 710 indicates saturation for byte 0.

It will be appreciated that algorithms designed to process fixed-point data in a SIMD fashion, may make use of saturation to avoid worst case wrap-around effects. Detection of saturation history may provide for greater design flexibility, for example, providing higher quality for the average case and detecting saturation to make computational adjustments such as rescaling of coefficients for the worst case.

Figure 8:
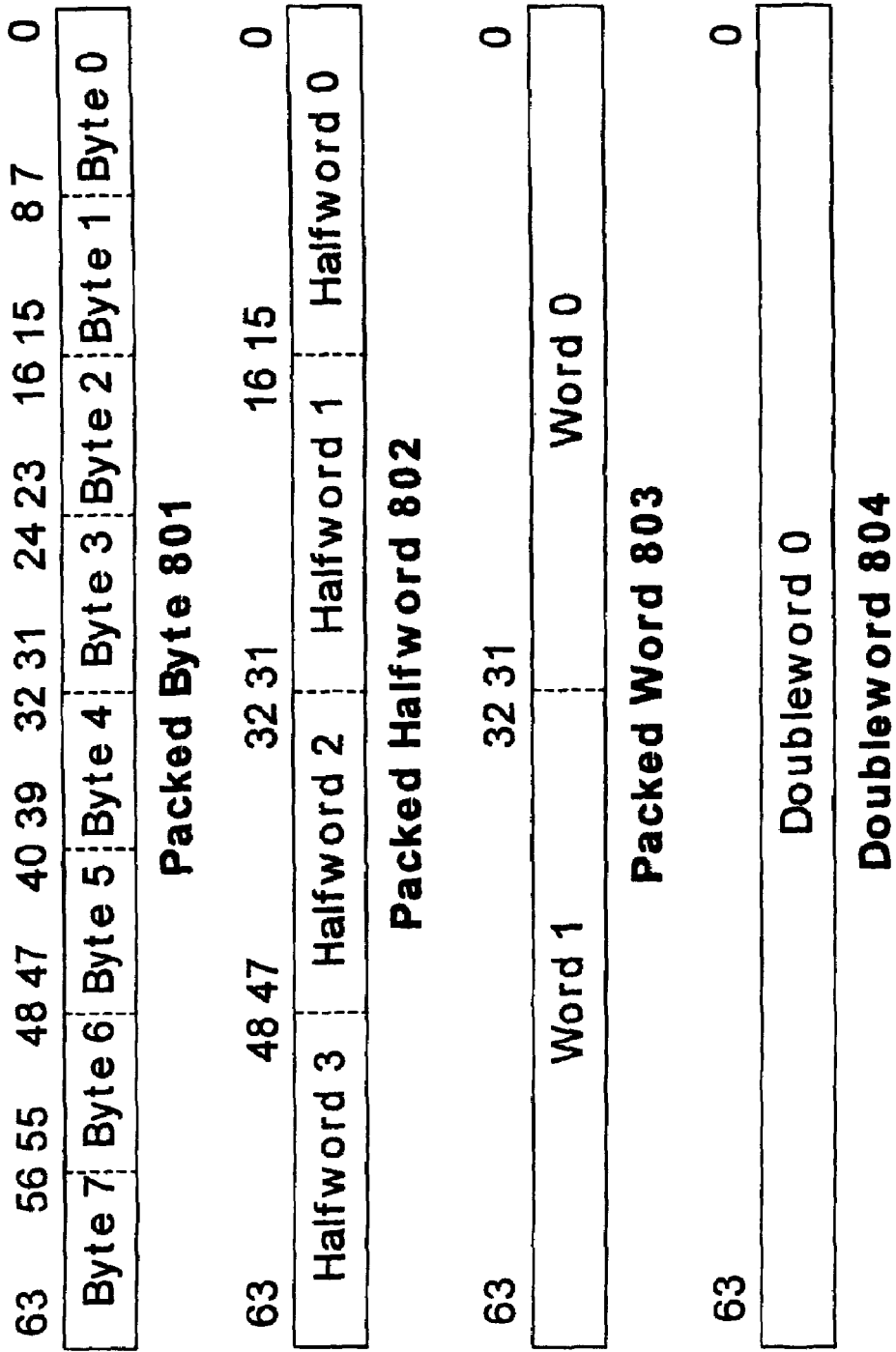
FIG. 8 is a depiction of alternative in-register data storage formats.

FIG. 8 illustrates alternative in-register fixed-point data storage formats. Each packed data includes more than one independent data element. Three packed data formats are illustrated; packed byte 801, packed half word 802 and packed word 803 together with double word 804. One embodiment of packed byte 801 is sixty-four bits long containing eight data elements. Each data element is one byte long. One alternative embodiment of packed byte 801 is one hundred twenty-eight bits long containing sixteen data elements. Generally, a data element is an individual piece of data that is stored in a single register (or memory location) with other data elements of the same length. In one embodiment of the present invention, the number of data elements stored in a register is sixty-four bits divided by the length in bits of a data element. In an alternative embodiment of the present invention, the number of data elements stored in a register is one hundred twenty-eight bits divided by the length in bits of a data element.

One embodiment of packed word 802 is sixty-four bits long and contains four half word data elements. Each half word data element contains sixteen bits of information.

One embodiment of packed word 803 is sixty-four bits long and contains two word data elements. Each word data element contains thirty-two bits of information.

It will be appreciated that such packed data formats may be further extended, for example, to 96-bits, 128-bits, 160-bits, 192-bits, 224-bits, 256-bits or more.

Description of Saturate/Unsaturate

As mentioned previously, opcode field 413 indicates for some operations whether said operations optionally saturate. Where the result of an operation, with saturate enabled, overflows or underflows the range of the data, the result will be clamped. Clamping means setting the result to a maximum or minimum value should a result exceed the range's maximum or minimum value. In the case of underflow, saturation clamps the result to the lowest value in the range and in the case of overflow, to the highest value. The allowable range for each data format of one embodiment is shown in Table 1.

TABLE 1

| Data Format | Minimum Value | Maximum Value |
| --- | --- | --- |
| Unsigned Byte | 0 | 255 |
| Signed Byte | −128 | 127 |
| Unsigned Half word | 0 | 65535 |
| Signed Half word | −32768 | 32767 |
| Unsigned Word | 0 | $2^{32} - 1$ |
| Signed Word | $-2^{31}$ | $2^{31} - 1$ |
| Unsigned Double word | 0 | $2^{64} - 1$ |
| Signed Double word | $2^{63}$ | $2^{63} - 1$ |

As mentioned above, opcode field 413 indicates for some operations whether saturating operations are being performed. Therefore, using the unsigned byte data format, if an operation's result=258 and saturation was enabled, then the result would be clamped to 255 before being stored into the operation's destination register. Similarly, if an operation's result=−32999 and coprocessor 226 used a signed word data format with saturation enabled, then the result would be clamped to −32768 before being stored into the operation's destination register.

With no saturation, only the lower bits of the result are presented. With unsigned saturation (US), the bits from zero to the maximum unsigned value may be presented. With signed saturation (SS), bits from the maximum positive to the maximum negative values are presented. In the pseudocode that follows the saturation types US and SS are indicated in curly brackets, {US, SS}, to indicate they are optional, but it will be appreciated that for some alternative embodiments of certain operations saturation may not be optional.

For example a saturating operation having a full word (32 bit) source data in the least significant word position of register wRn and half word (16 bit) result data in the least significant half word position of register wRd is indicated as follows:

wRd[half 0]←saturate(wRn[word 0], {US,SS}, 16);
and saturation is optionally performed to the minimum and maximum unsigned or the minimum and maximum signed values represented by 16 bits.

Figure 9A:
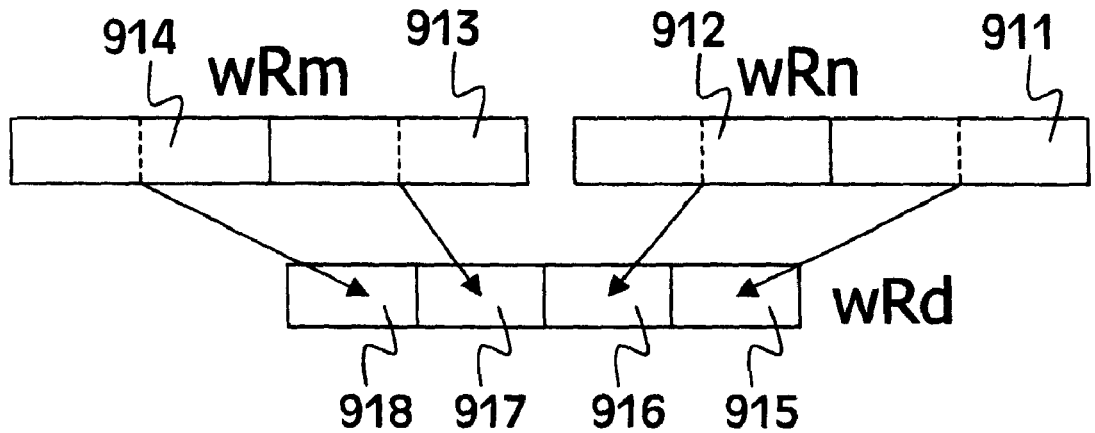
FIG. 9a illustrates one embodiment of a SIMD operation which may store SIMD saturation history.

FIG. 9a illustrates one embodiment of a SIMD pack operation, which may store SIMD saturation history. The pack operation packs data from two source registers into a single destination register. The source data can be a half word, word, or double word. It can use signed saturation and unsigned saturation during packing. An operation encoding for one embodiment of the pack operation is may be summarized as shown in Table 2.

TABLE 2

| 31-28 | 27-24 | 23-20 | 19-16 | 15-12 | 11-8 | 7-5 | 4 | 3-0 |
| --- | --- | --- | --- | --- | --- | --- | --- | --- |
| Cond | 1110 | wwss | wRn | wRd | 0000 | 100 | 0 | wRm |

The values in bit positions 23 and 22 determine the source data size. A half word source data size is set for a value of 01, the word source data size is set for a value of 10, and a double word source data size is set for a value of 11. For one embodiment of the pack operation the result data size is half of the source data size but the invention is not so limited.

The values in positions 21 and 20 determine the saturation type. Unsigned saturation is specified by a value of 01 and signed saturation is specified by a value of 11. The saturation specified is performed to the result data size. For one embodiment of the pack operation, all source data are treated as signed values but the invention is not so limited.

For one embodiment of the pack instruction, data from wRn and wRm is packed into wRd, with wRm being packed in the upper half and wRn being packed in the lower half for vectors of 16, 32, or 64 bit source data and 8, 16, and 32-bit result data respectively. For example, a pack operation packing words into half words is illustrated in FIG. 9a. Source register wRm contains word data 914 and 913, which are packed into half word result data 918 and 917 respectively. Source register wRm contains word data 912 and 911, which are packed into half word result data 916 and 915 respectively. The results are saturated according to the saturation specified and placed in destination register wRd.

Figure 9B:
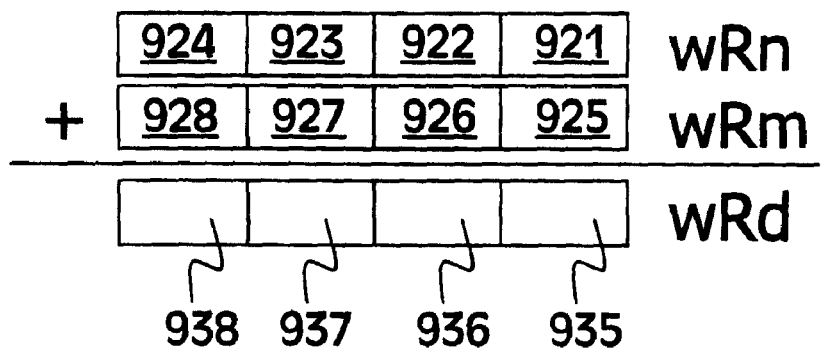
FIG. 9b illustrates an alternative embodiment of a SIMD operation which may store SIMD saturation history.

For one embodiment of the pack operation, packing can be performed with signed or unsigned saturation as shown below and SIMD saturation history may be stored according to which result data saturate. For a half word source data and byte result data:

wRd[byte 7]←saturate(wRm[half 3], {US,SS}, 8));
wCSSF[bit 7]←saturate(wRm[half 3], {US,SS}, 8))≠wRm[half 3])|wCSSF[bit 7];
wRd[byte 6]←saturate(wRm[half 2], {US,SS}, 8);
wCSSF[bit 6]←saturate(wRm[half 2], {US,SS}, 8))≠wRm[half 2])|wCSSF[bit 6];
wRd[byte 5]←saturate(wRm[half 1], {US,SS}, 8);
wCSSF[bit 5]←saturate(wRm[half 1], {US,SS}, 8))≠wRm[half 1])|wCSSF[bit 5];
wRd[byte 4]←saturate(wRm[half 0], {US,SS}, 8);
wCSSF[bit 4]←saturate(wRm[half 0], {US,SS}, 8))≠wRm[half 0])|wCSSF[bit 4];
wRd[byte 3]←saturate(wRn[half 3], {US,SS}, 8);
wCSSF[bit 3]←saturate(wRn[half 3], {US,SS}, 8))≠wRn[half 3])|wCSSF[bit 3];
wRd[byte 2]←saturate(wRn[half 2], {US,SS}, 8);
wCSSF[bit 2]←saturate(wRn[half 2], {US,SS}, 8))≠wRn[half 2])|wCSSF[bit 2];
wRd[byte 1]←saturate(wRn[half 1], {US,SS}, 8);
wCSSF[bit 1]←saturate(wRn[half 1], {US,SS}, 8))≠wRn[half 1])|wCSSF[bit 1];
wRd[byte 0]←saturate(wRn[half 0], {US,SS}, 8);
wCSSF[bit 0]←saturate(wRn[half 0], {US,SS}, 8))≠wRn[half 0])|wCSSF[bit 0];

For full word source data and half word result data:
wRd[half 3]←saturate(wRm[word 1], {US,SS}, 16);
wCSSF[bit 7]←saturate(wRm[word 1], {US,SS}, 16))≠wRm[word 1])|wCSSF[bit 7];
wRd[half 2]←saturate(wRm[word 0], {US,SS}, 16);
wCSSF[bit 5]←saturate(wRm[word 0], {US,SS}, 16))≠wRm[word 0])|wCSSF[bit 5];
wRd[half 1]←saturate(wRn[word 1], {US,SS}, 16);
wCSSF[bit 3]←(saturate(wRn[word 1], {US,SS}, 16))≠wRn[word 1])|wCSSF[bit 3];
wRd[half 0]←saturate(wRn[word 0], {US,SS}, 16);
wCSSF[bit 1]←(saturate(wRn[word 0], {US,SS}, 16))≠wRn[word 0])|wCSSF[bit 1];

For double word source data and word result data:
wRd[word 1]←saturate(wRm, {US,SS}, 32);
wCSSF[bit 7]←saturate(wRm, {US,SS}, 32))≠wRm)|wCSSF[bit 7];
wRd[word 0]←saturate(wRn, {US,SS}, 32);
wCSSF[bit 3]←saturate(wRn, {US,SS}, 32))≠wRn)|wCSSF[bit 3];

For one embodiment of the pack operation the SIMD saturation history is sticky as shown above, wherein the saturation bit will stay set after being set once. For an alternative embodiment, the SIMD saturation history is not sticky. An example of packing double word source data to word result data with non-sticky SIMD saturation history follows:

wRd[word 1]←saturate(wRm, {US,SS}, 32);
wCSSF[bit 7]←saturate(wRm, {US,SS}, 32))≠wRm);
wCSSF[bit 6-bit 4]←000;
wRd[word 0]←saturate(wRn, {US,SS}, 32);
wCSSF[bit 3]←saturate(wRn, {US,SS}, 32))≠wRn);
wCSSF[bit 2-bit 0]←000;

FIG. 9b illustrates an alternative embodiment of a SIMD add operation which may store SIMD saturation history. The add instruction performs vector addition of source register (wRn and wRm) contents for vectors of 8, 16, or 32 bit signed or unsigned data. The instruction places the result in destination register wRd. For one embodiment of the add operation, saturation can be specified as signed, unsigned, or no saturation.

An operation encoding for one embodiment of the SIMD add operation is may be summarized as shown in Table 3.

TABLE 3

| 31-28 | 27-24 | 23-20 | 19-16 | 15-12 | 11-8 | 7-5 | 4 | 3-0 |
|---|---|---|---|---|---|---|---|---|
| Cond | 1110 | wwss | wRn | wRd | 0001 | 100 | 0 | wRm |

The values in bit positions 23 and 22 determine the source data size. A byte source data size is set for a value of 00, a half word source data size is set for a value of 01, and a word source data size is set for a value of 10. For one embodiment of the SIMD add operation the result data size is the same as the source data size but the invention is not so limited. For an alternative embodiment of the SIMD add operation the result data size is less than the source data size.

The values in positions 21 and 20 determine the saturation type. No saturation is specified by a value of 00, unsigned saturation is specified by a value of 01 and signed saturation is specified by a value of 11. The saturation specified is performed to the result data size.

For example, a SIMD add operation adding half words is illustrated in FIG. 9b. Source register wRn contains half word data 924, 923, 922 and 921, which are added to half word data 928, 927, 926 and 925 respectively of register wRm. The respective half word results, 938, 937, 936 and 935, are saturated according to the saturation specified and placed in destination register wRd. For one embodiment of the SIMD add operation, addition can be performed with signed or unsigned saturation as shown below and SIMD saturation history may be stored according to which result data saturate. For byte result data:

wRd[byte 7]←saturate(wRn[byte 7]+wRm[byte 7], {US,SS}, 8)
wCSSF[bit 7]←wRd[byte 7]≠(wRn[byte 7]+wRm[byte 7]))|wCSSF[bit 7]
wRd[byte 6]←saturate(wRn[byte 6]+wRm[byte 6], {US,SS}, 8)

wCSSF[bit 6]←wRd[byte 6]≠(wRn[byte 6]+wRm[byte 6]))|wCSSF[bit 6]
wRd[byte 5]←saturate(wRn[byte 5]+wRm[byte 5], {US, SS}, 8)
wCSSF[bit 5]←wRd[byte 5]≠(wRn[byte 5]+wRm[byte 5]))|wCSSF[bit 5]
wRd[byte 4]←saturate(wRn[byte 4]+wRm[byte 4], {US, SS}, 8)
wCSSF[bit 4]←wRd[byte 4]≠(wRn[byte 4]+wRm[byte 4]))|wCSSF[bit 4]
wRd[byte 3]←saturate(wRn[byte 3]+wRm[byte 3], {US, SS}, 8)
wCSSF[bit 3]←wRd[byte 3]≠(wRn[byte 3]+wRm[byte 3]))|wCSSF[bit 3]
wRd[byte 2]←saturate(wRn[byte 2]+wRm[byte 2], {US, SS}, 8)
wCSSF[bit 2]←wRd[byte 2]≠(wRn[byte 2]+wRm[byte 2]))|wCSSF[bit 2]
wRd[byte 1]←saturate(wRn[byte 1]+wRm[byte 1], {US, SS}, 8)
wCSSF[bit 1]←wRd[byte 1]≠(wRn[byte 1]+wRm[byte 1]))|wCSSF[bit 1]
wRd[byte 0]←saturate(wRn[byte 0]+wRm[byte 0], {US, SS}, 8)
wCSSF[bit 0]←wRd[byte 0]≠(wRn[byte 0]+wRm[byte 0]))|wCSSF[bit 0]

For half word result data:
wRd[half 3]←saturate(wRn[half 3]+wRm[half 3], {US, SS}, 16)
wCSSF[bit 7]←wRd[half 3]≠(wRn[half 3]+wRm[half 3]))|wCSSF[bit 7]
wRd[half 2]←saturate(wRn[half 2]+wRm[half 2], {US, SS}, 16)
wCSSF[bit 5]←wRd[half 2]≠(wRn[half 2]+wRm[half 2]))|wCSSF[bit 5]
wRd[half 1]←saturate(wRn[half 1]+wRm[half 1], {US, SS}, 16)
wCSSF[bit 3]←(wRd[half 1]≠(wRn[half 1]+wRm[half 1]))|wCSSF[bit 3]
wRd[half 0]←saturate(wRn[half 0]+wRm[half 0], {US, SS}, 16)
wCSSF[bit 1]←wRd[half 0]≠(wRn[half 0]+wRm[half 0]))|wCSSF[bit 1]

For word result data:
wRd[word 1]←saturate(wRn[word 1]+wRm[word 1], {US,SS}, 32)
wCSSF[bit 7]←wRd[word 1]≠(wRn[word 1]+wRm[word 1]))|wCSSF[bit 7]
wRd[word 0]←saturate(wRn[word 0]+wRm[word 0], {US,SS}, 32)
wCSSF[bit 3]←wRd[word 0]≠(wRn[word 0]+wRm[word 0]))|wCSSF[bit 3]

For one embodiment of the SIMD add operation the SIMD saturation history is sticky as shown above. For an alternative embodiment, the SIMD saturation history is not sticky.

Figure 9C:
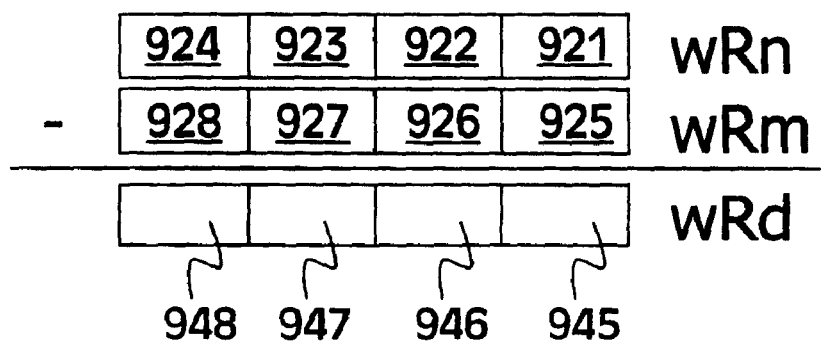
FIG. 9c illustrates another alternative embodiment of a SIMD operation which may store SIMD saturation history.

FIG. 9c illustrates another alternative embodiment of a SIMD subtract operation which may store SIMD saturation history. The subtract instruction performs vector subtraction of source register (wRn and wRm) contents for vectors of 8, 16, or 32 bit signed or unsigned data. The instruction places the result in destination register wRd. For one embodiment of the subtract operation, saturation can be specified as signed, unsigned, or no saturation.

An operation encoding for one embodiment of the SIMD subtract operation may be summarized as shown in Table 4.

TABLE 4

| 31-28 | 27-24 | 23-20 | 19-16 | 15-12 | 11-8 | 7-5 | 4 | 3-0 |
|---|---|---|---|---|---|---|---|---|
| Cond | 1110 | wwss | wRn | wRd | 0001 | 101 | 0 | wRm |

The values in bit positions 23 and 22 determine the source data size. For one embodiment of the SIMD subtract operation data size is specified in the same way as the SIMD add operation. The values in positions 21 and 20 determine the saturation type. For one embodiment of the SIMD subtract operation saturation is specified in the same way as the SIMD add operation.

For example, a SIMD subtract operation subtracting half words is illustrated in FIG. 9c. Source register wRn contains half word data 924, 923, 922 and 921, from which are subtracted half word data 928, 927, 926 and 925 respectively of register wRm. The respective half word results, 948, 947, 946 and 945, are saturated according to the saturation specified and placed in destination register wRd. For one embodiment of the SIMD subtraction operation, subtraction can be performed with signed or unsigned saturation as shown below and SIMD saturation history may be stored according to which result data saturate. For byte result data:
wRd[byte 7]←saturate(wRn[byte 7]−wRm[byte 7], {US, SS}, 8)
wCSSF[bit 7]←wRd[byte 7]≠(wRn[byte 7]−wRm[byte 7]))|wCSSF[bit 7]
wRd[byte 6]←saturate(wRn[byte 6]−wRm[byte 6], {US, SS}, 8)
wCSSF[bit 6]←wRd[byte 6]≠(wRn[byte 6]−wRm[byte 6]))|wCSSF[bit 6]
wRd[byte 5]←saturate(wRn[byte 5]−wRm[byte 5], {US, SS}, 8)
wCSSF[bit 5]←wRd[byte 5]≠(wRn[byte 5]−wRm[byte 5]))|wCSSF[bit 5]
wRd[byte 4]←saturate(wRn[byte 4]−wRm[byte 4], {US, SS}, 8)
wCSSF[bit 4]←wRd[byte 4]≠(wRn[byte 4]−wRm[byte 4]))|wCSSF[bit 4]
wRd[byte 3]←saturate(wRn[byte 3]−wRm[byte 3], {US, SS}, 8)
wCSSF[bit 3]←(wRd[byte 3]≠(wRn[byte 3]−wRm[byte 3]))|wCSSF[bit 3]
wRd[byte 2]←saturate(wRn[byte 2]−wRm[byte 2], {US, SS}, 8)
wCSSF[bit 2]←wRd[byte 2]≠(wRn[byte 2]−wRm[byte 2]))|wCSSF[bit 2]
wRd[byte 1]←saturate(wRn[byte 1]−wRm[byte 1], {US, SS}, 8)
wCSSF[bit 1]←(wRd[byte 1]≠(wRn[byte 1]−wRm[byte 1]))|wCSSF[bit 1]
wRd[byte 0]←saturate(wRn[byte 0]−wRm[byte 0], {US, SS}, 8)
wCSSF[bit 0]←wRd[byte 0]≠(wRn[byte 0]−wRm[byte 0]))|wCSSF[bit 0]

For half word result data:
wRd[half 3]←saturate(wRn[half 3]−wRm[half 3], {US, SS}, 16)
wCSSF[bit 7]←wRd[half 3]≠(wRn[half 3]−wRm[half 3]))|wCSSF[bit 7]
wRd[half 2]←saturate(wRn[half 2]−wRm[half 2], {US, SS}, 16)
wCSSF[bit 5]←wRd[half 2]≠(wRn[half 2]−wRm[half 2]))|wCSSF[bit 5]
wRd[half 1]←saturate(wRn[half 1]−wRm[half 1], {US, SS}, 16)

wCSSF[bit 3]←wRd[half 1]≠(wRn[half 1]−wRm[half 1]))|wCSSF[bit 3]

wRd[half 0]←saturate(wRn[half 0]−wRm[half 0], {US, SS}, 16)

wCSSF[bit 1]←wRd[half 0]≠(wRn[half 0]−wRm[half 0]))|wCSSF[bit 1]

For word result data:

wRd[word 1]←saturate(wRn[word 1]−wRm[word 1], {US,SS}, 32)

wCSSF[bit 7]←(wRd[word 1]≠(wRn[word 1]−wRm[word 1]))|wCSSF[bit 7]

wRd[word 0]←saturate(wRn[word 0]−wRm[word 0], {US,SS}, 32)

wCSSF[bit 3]←wRd[word 0]≠(wRn[word 0]−wRm[word 0]))|wCSSF[bit 3]

For one embodiment of the SIMD subtract operation the SIMD saturation history is sticky as shown above. For an alternative embodiment, the SIMD saturation history is not sticky.

It will be appreciated that SIMD operations, which may store SIMD saturation history can be used to perform essential computations on packed data and conversions between representations of varying precision. One embodiment of processing core 120 or of processing core 220 or of coprocessor 226 or of coprocessor 301 can execute SIMD instructions to perform a SIMD pack, a SIMD add and a SIMD subtract operation, each of which may store SIMD saturation history. One alternative embodiment of processing core 120 or of processing core 220 or of coprocessor 226 or of coprocessor 301 can execute other SIMD instructions to perform operations which may store SIMD saturation history.

Figure 10A:
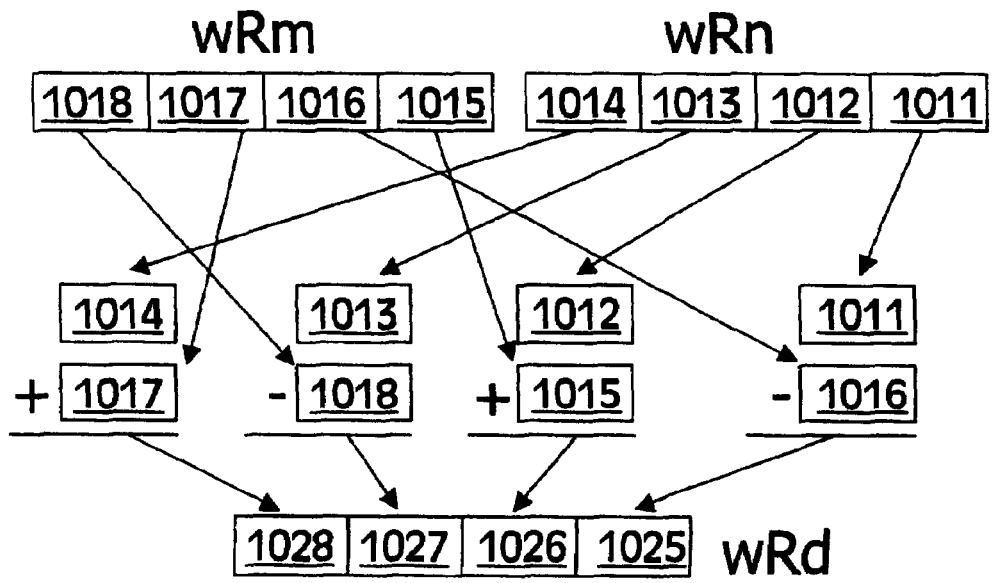
FIG. 10a illustrates another alternative embodiment of a SIMD operation which may store SIMD saturation history.

FIG. 10*a* illustrates another alternative embodiment of a SIMD complex subtraction-addition operation, which may store SIMD saturation history. One embodiment of the complex subtraction-addition instruction performs complex vector subtraction-addition of source register (wRn and wRm) contents for vectors of 16 bit signed data. An alternative embodiment of the complex subtraction-addition instruction performs complex vector subtraction-addition for vectors of 8, 16, or 32 bit signed or unsigned data. The instruction places the result in destination register wRd. For one embodiment of the complex vector subtraction-addition operation, signed saturation of result data is performed. For an alternative embodiment of the complex vector subtraction-addition operation, saturation can be specified as signed, unsigned, or no saturation.

An operation encoding for one embodiment of the SIMD complex subtraction-addition operation may be summarized as shown in Table 5.

TABLE 5

| 31-28 | 27-24 | 23-20 | 19-16 | 15-12 | 11-8 | 7-5 | 4 | 3-0 |
|---|---|---|---|---|---|---|---|---|
| Cond | 1110 | 1101 | wRn | wRd | 0001 | 110 | 0 | wRm |

For example, a SIMD complex addition-subtraction operation on half word data is illustrated in FIG. 10*a*. Source register wRn contains half word data 1013 and 1011, from which are subtracted half word data 1018 and 1016 respectively of register wRm. The respective half word results, 1027 and 1025, are saturated and placed in destination register wRd. Source register wRn also contains half word data 1014 and 1012, to which are added half word data 1017 and 1015 respectively of register wRm. The respective half word results, 1028 and 1026, are saturated and placed in destination register wRd. For one embodiment of the SIMD complex subtraction-addition operation, subtraction and addition can be performed with signed saturation as shown below and SIMD saturation history may be stored according to which result data saturate. For half word result data:

wRd[half 3]←saturate(wRn[half 3]+wRm[half 2], {US, SS}, 16)

wCSSF[bit 7]←wRd[half 3]≠(wRn[half 3]+wRm[half 2]))|wCSSF[bit 7]

wRd[half 2]←saturate(wRn[half 2]−wRm[half 3], {US, SS}, 16)

wCSSF[bit 5]←wRd[half 2]≠(wRn[half 2]−wRm[half 3]))|wCSSF[bit 5]

wRd[half 1]←saturate(wRn[half 1]+wRm[half 0], {US, SS}, 16)

wCSSF[bit 3]←wRd[half 1]≠(wRn[half 1]+wRm[half 0]))|wCSSF[bit 3]

wRd[half 0]←saturate(wRn[half 0]−wRm[half 1], {US, SS}, 16)

wCSSF[bit 1]←wRd[half 0]≠(wRn[half 0]−wRm[half 1]))|wCSSF[bit 1]

It will be appreciated that such a complex subtraction-addition operation may provide for butterfly operations on real and complex data, for example in a discrete cosine transformation (DCT) or a fast Fourier transform (FFT). For one embodiment of the SIMD complex subtraction-addition operation the SIMD saturation history is sticky as shown above. For an alternative embodiment, the SIMD saturation history is not sticky.

Figure 10B:
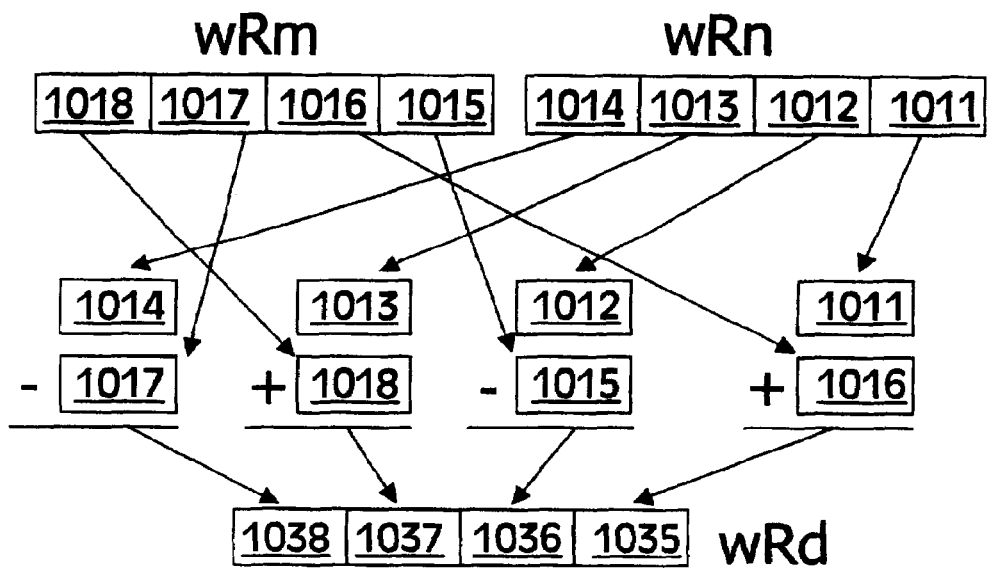
FIG. 10b illustrates another alternative embodiment of a SIMD operation which may store SIMD saturation history.

FIG. 10*b* illustrates another alternative embodiment of a SIMD complex addition-subtraction operation which may store SIMD saturation history. One embodiment of the complex addition-subtraction instruction performs complex vector addition-subtraction of source register (wRn and wRm) contents for vectors of 16 bit signed data. An alternative embodiment of the complex addition-subtraction instruction performs complex vector addition-subtraction for vectors of 8, 16, or 32 bit signed or unsigned data. The instruction places the result in destination register wRd. For one embodiment of the complex vector addition-subtraction operation, signed saturation of result data is performed. For an alternative embodiment of the complex vector addition-subtraction operation, saturation can be specified as signed, unsigned, or no saturation.

An operation encoding for one embodiment of the SIMD complex addition-subtraction operation may be summarized as shown in Table 6.

TABLE 6

| 31-28 | 27-24 | 23-20 | 19-16 | 15-12 | 11-8 | 7-5 | 4 | 3-0 |
|---|---|---|---|---|---|---|---|---|
| Cond | 1110 | 1010 | wRn | wRd | 0001 | 101 | 0 | wRm |

For example, a SIMD complex addition-subtraction operation on half word data is illustrated in FIG. 10*b*. Source register wRn contains half word data 1013 and 1011, to which are added half word data 1018 and 1016 respectively of register wRm. The respective half word results, 1037 and 1035, are saturated and placed in destination register wRd. Source register wRn also contains half word data 1014 and 1012, from which are subtracted half word data 1017 and 1015 respectively of register wRm. The respective half word results, 1038 and 1036, are saturated and placed in destination register wRd. For one embodiment of the SIMD complex addition-subtraction operation, addition and subtraction can be performed with signed saturation as shown below and SIMD saturation history may be stored according to which result data saturate. For half word result data:

wRd[half 3]←saturate(wRn[half 3]−wRm[half 2], {US, SS}, 16)
    wCSSF[bit 7]←wRd[half 3]≠(wRn[half 3]−wRm[half 2]))|wCSSF[bit 7]
wRd[half 2]←saturate(wRn[half 2]≠wRm[half 3], {US, SS}, 16)
    wCSSF[bit 5]←wRd[half 2]≠(wRn[half 2]+wRm[half 3]))|wCSSF[bit 5]
wRd[half 1]←saturate(wRn[half 1]−wRm[half 0], {US, SS}, 16)
    wCSSF[bit 3]←(wRd[half 1]≠(wRn[half 1]−wRm[half 0]))|wCSSF[bit 3]
wRd[half 0]←saturate(wRn[half 0]+wRm[half 1], {US, SS}, 16)
    wCSSF[bit 1]←wRd[half 0]≠(wRn[half 0]+wRm[half 1]))|wCSSF[bit 1]

Figure 11:
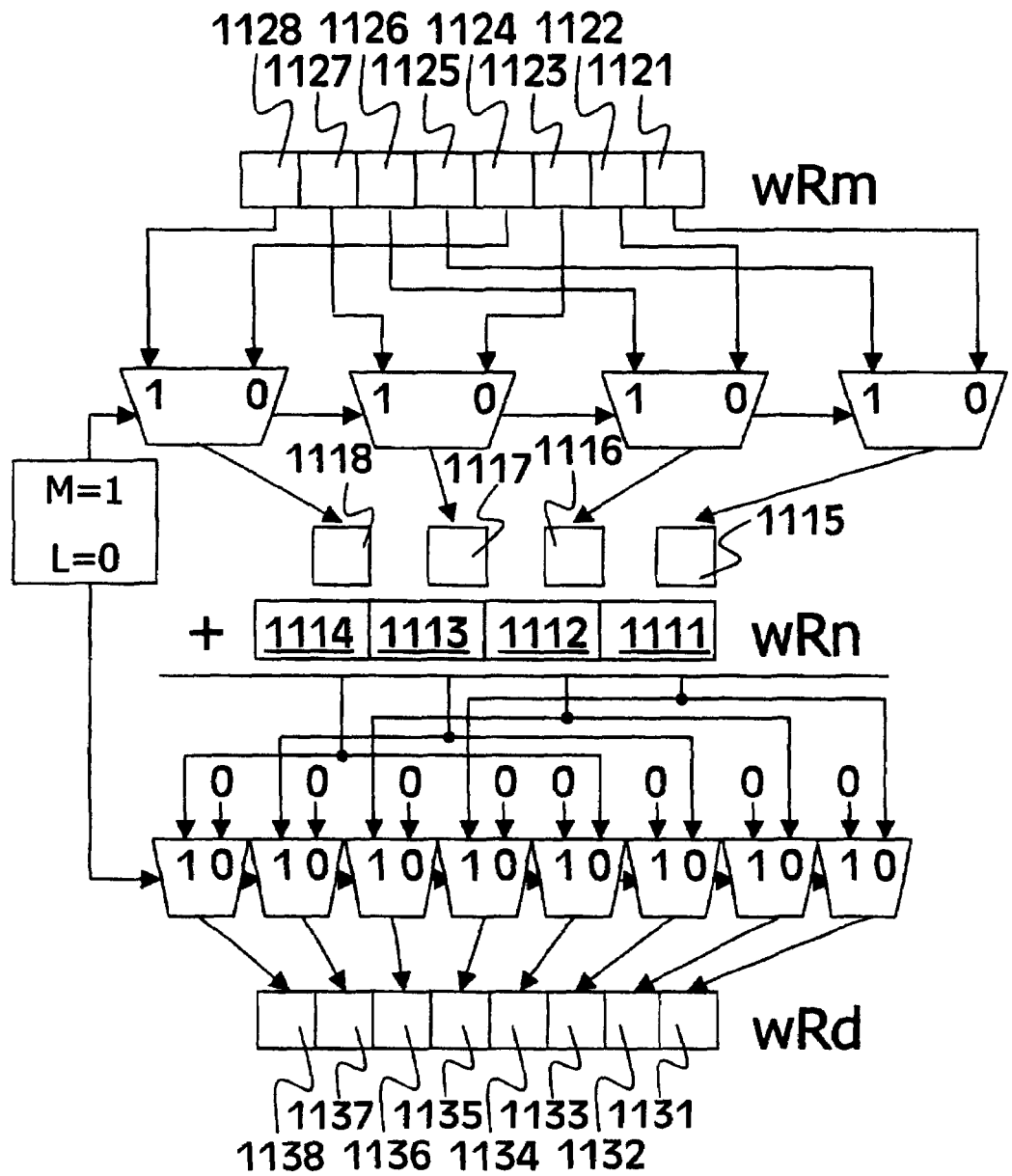
FIG. 11 illustrates another alternative embodiment of a SIMD operation which may store SIMD saturation history.

FIG. 11 illustrates another alternative embodiment of a SIMD mixed mode addition operation, which may store SIMD saturation history. The mixed mode addition instruction performs vector addition of four 16-bit source data of register wRn and four 8-bit source data of register wRm. The instruction places the result in destination register wRd. For one embodiment of the mixed mode addition operation, saturation is unsigned. For an alternative embodiment of the mixed mode addition operation, saturation can be specified as signed, unsigned, or no saturation.

An operation encoding for one embodiment of the SIMD mixed mode addition operation may be summarized as shown in Table 7.

TABLE 7

| 31-28 | 27-24 | 23-20 | 19-16 | 15-12 | 11-8 | 7-5 | 4 | 3-0 |
|---|---|---|---|---|---|---|---|---|
| Cond | 1110 | 0f10 | wRn | wRd | 0001 | 101 | 0 | wRm |

The value in bit position 22 determine the source data location. Byte source data from the most significant end of register wRm is set for a value of 1. Byte source data from the least significant end of register wRm is set for a value of 0. For one embodiment of the SIMD mixed mode addition operation the result data size is 8 bits but the invention is not so limited. For one alternative embodiment of the SIMD mixed mode addition operation the result data size is the same as that of source data from register wRm. For another alternative embodiment of the SIMD mixed mode addition operation the result data size is the same as that of source data from register wRn. Saturation is performed to the result data size.

For example, a SIMD mixed mode addition operation adding half words to bytes is illustrated in FIG. 11. Source register wRn contains half word data 1114, 1113, 1112 and 1111, which are added to byte data 1118, 1117, 1116 and 1115 respectively. Byte data 1118, 1117, 1116 and 1115 are selected from bytes 1128 or 1124, 1127 or 1123, 1126 or 1122 and 1125 or 1121 of register wRm dependent upon whether the most significant (M) half or the least significant (L) half is specified in the SIMD mixed mode addition operation. The resulting half word results are saturated according to byte values and placed in destination register wRd at bytes 1138 or 1134, 1137 or 1133, 1136 or 1132 and 1135 or 1131 dependent upon whether the most significant (M) half or the least significant (L) half is specified in the SIMD mixed mode addition operation. For one embodiment of the SIMD mixed mode addition operation, addition can be performed with unsigned saturation as shown below and SIMD saturation history may be stored according to which result data saturate. For byte result data:

```
If (M specified) then {
  wRd[byte 7] ←saturate(wRn[half 3]+wRm[byte 7], US, 8)
  wCSSF[bit 7] ←(wRd[byte 7] ≠ (wRn[half 3]+wRm[byte 7]) ) |
  wCSSF[bit 7]
  wRd[byte 6] ←saturate(wRn[half 2]+wRm[byte 6], US, 8)
  wCSSF[bit 6] ←(wRd[byte 6] ≠ (wRn[half 2]+wRm[byte 6]) ) |
  wCSSF[bit 6]
  wRd[byte 5] ←saturate(wRn[half 1]+wRm[byte 5], US, 8)
  wCSSF[bit 5] ←(wRd[byte 5] ≠ (wRn[half 1]+wRm[byte 5]) ) |
  wCSSF[bit 5]
  wRd[byte 4] ←saturate(wRn[half 0]+wRm[byte 4], US, 8)
  wCSSF[bit 4] ←(wRd[byte 4] ≠ (wRn[half 0]+wRm[byte 4]) ) |
  wCSSF[bit 4]
  wRd[byte 3] ←0
  wCSSF[bit 3] ←wCSSF[bit 3]
  wRd[byte 2] ←0
  wCSSF[bit 2] ←wCSSF[bit 2]
  wRd[byte 1] ←0
  wCSSF[bit 1] ←wCSSF[bit 1]
  wRd[byte 0] ←0
  wCSSF[bit 0] ←wCSSF[bit 0]
}
If (L specified) then {
  wRd[byte 7] ←0
  wCSSF[bit 7] ←wCSSF[bit 7]
  wRd[byte 6] ←0
  wCSSF[bit 6] ←wCSSF[bit 6]
  wRd[byte 5] ←0
  wCSSF[bit 5] ←wCSSF[bit 5]
  wRd[byte 4] ←0
  wCSSF[bit 4] ←wCSSF[bit 4]
  wRd[byte 3] ←saturate(wRn[half 3]+wRm[byte 3], US, 8)
  wCSSF[bit 3] ←(wRd[byte 3] ≠ (wRn[half 3]+wRm[byte 3]) ) |
  wCSSF[bit 3]
  wRd[byte 2] ←saturate(wRn[half 2]+wRm[byte 2], US, 8)
  wCSSF[bit 2] ←(wRd[byte 2] ≠ (wRn[half 2]+wRm[byte 2]) ) |
  wCSSF[bit 2]
  wRd[byte 1] ←saturate(wRn[half 1]+wRm[byte 1], US, 8)
  wCSSF[bit 1] ←(wRd[byte 1] ≠ (wRn[half 1]+wRm[byte 1]) ) |
  wCSSF[bit 1]
  wRd[byte 0] ←saturate(wRn[half 0]+wRm[byte 0], US, 8)
  wCSSF[bit 0] ←(wRd[byte 0] ≠ (wRn[half 0]+wRm[byte 0]) ) |
  wCSSF[bit 0]
}
```

For one alternative embodiment of the SIMD mixed mode addition operation, addition can be performed with signed saturation or unsigned saturation. For another alternative embodiment of the SIMD mixed mode addition operation, SIMD saturation history wCSSF[bits 3-0] or wCSSF[bits 7-4] may be cleared dependent upon whether the most significant (M) half or the least significant (L) half is specified in the SIMD mixed mode addition operation.

It will be appreciated that a SIMD mixed mode addition operation may provide for efficient residual addition as used in motion video decoding, for example.

Figure 12:
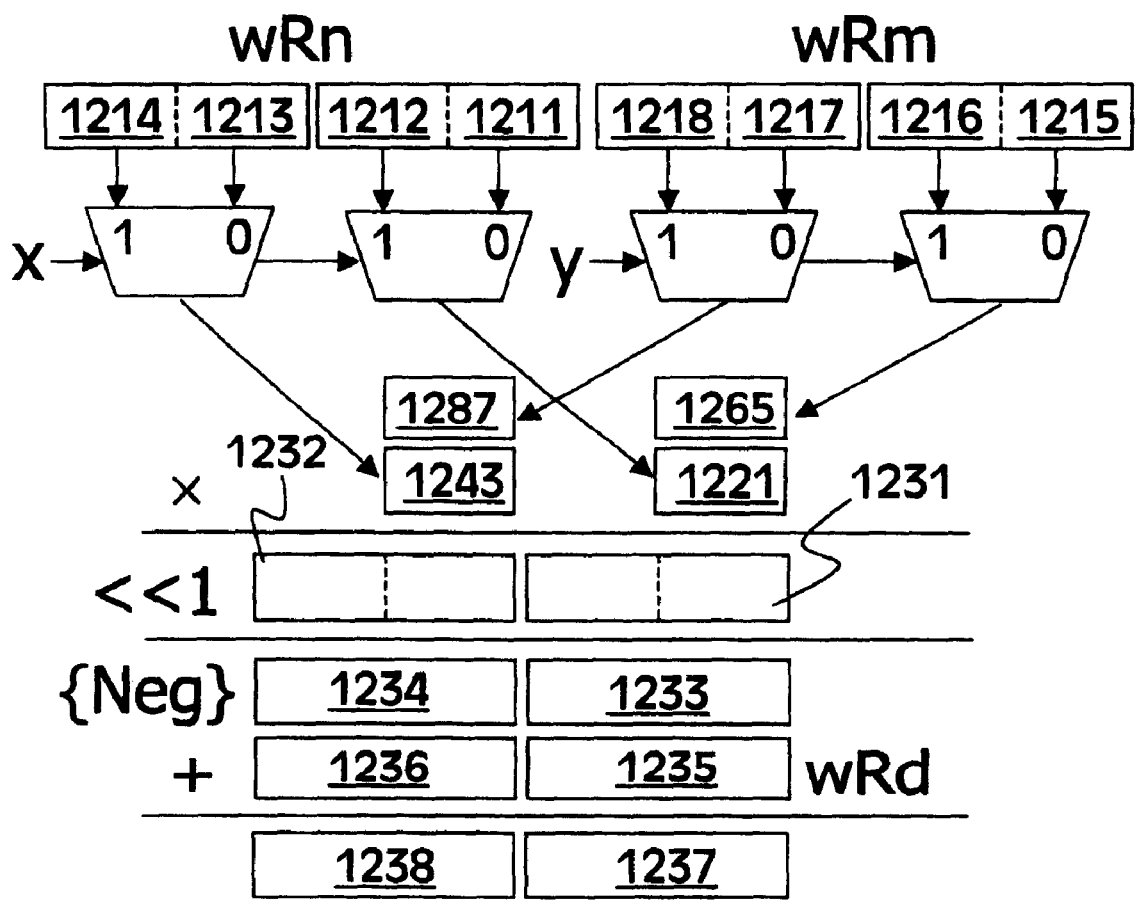
FIG. 12 illustrates another alternative embodiment of a SIMD operation, which may store SIMD saturation history.

FIG. 12 illustrates another alternative embodiment of a SIMD fraction multiply or multiply-negate and accumulate operation, which may store SIMD saturation history. The fraction multiply or multiply-negate and accumulate instruction performs fractional multiplication of the upper or lower 16-bits of 32-bit source operands from register wRn and the upper or lower 16-bits of 32-bit source operands from register wRm. Intermediate results of the multiplications are doubled (or shifted left one bit position).

The instruction optionally negates the doubled results and accumulates them into destination register wRd. For one embodiment of the fraction multiply or multiply-negate and accumulate operation, multiplication and doubling of 16-bit data each having hexadecimal values 0x8000 is clamped to 0x7FFFFFFF and saturation of the 32-bit accumulations is signed. For an alternative embodiment of the fraction multiply or multiply-negate and accumulate operation, saturation can be specified as signed, unsigned, or no saturation. For another alternative embodiment SIMD saturation history may be stored according to which multiplications saturate.

An operation encoding for one embodiment of the SIMD fraction multiply or multiply-negate and accumulate operation may be summarized as shown in Table 8.

TABLE 8

| 31-28 | 27-24 | 23-20 | 19-16 | 15-12 | 11-8 | 7-5 | 4 | 3-0 |
|---|---|---|---|---|---|---|---|---|
| Cond | 1110 | 1nxy | wRn | wRd | 0000 | 101 | 0 | wRm |

The values in bit positions 22 determines whether a fraction multiply and accumulate (n=0) or a fraction multiply-negate and accumulate (n=1) operation will be preformed. The values in bit positions 21 and 20 determine the source data locations. Half word source data from the most significant ends of each word in registers wRn and wRm are selected for a value of 11. Half word source data from the least significant ends of each word in registers wRn and wRm are selected for a value of 00. Half word source data from the least significant ends of each word in registers wRn and from the most significant ends of each word in registers wRm are selected for a value of 01. Half word source data from the most significant ends of each word in registers wRn and from the least significant ends of each word in registers wRm are selected for a value of 10. Saturation is performed to the result data size of 32-bits.

For example, one embodiment of a SIMD fraction multiply or multiply-negate and accumulate operation is illustrated in FIG. 12. Source register wRn contains half word data 1214 or 1213, and half word data 1212 or 1211, which are selected for multiplication operands 1243 and 1221 respectively according to the value of x (bit 21). Source register wRm contains half word data 1218 or 1217, and half word data 1216 or 1215, which are selected for multiplication operands 1287 and 1265 respectively according to the value of y (bit 20). Multiplication operands 1287 and 1243 are multiplied together to produce intermediate result 1232 and multiplication operands 1265 and 1221 are multiplied together to produce intermediate result 1231. Intermediate results 1232 and 1231 are doubled (or shifted left one bit position) to generate intermediate results 1234 and 1233 respectively. For one embodiment of the fraction multiply or multiply-negate and accumulate operation, intermediate results 1234 and 1233 are clamped to a hexadecimal value of 0x7FFFFFFF if each of their multiplication operands had hexadecimal values of 0x8000. For one alternative embodiment SIMD saturation history may be stored according to which intermediate results saturate. Dependent on the value of n (bit 22) the intermediate results 1234 and 1233 are negated (n=1) or not negated (n=0) and accumulated with word data 1236 and 1235 from wRd. The accumulated word results 1238 and 1237 are saturated placed in destination register wRd. For one embodiment of the SIMD fraction multiply or multiply-negate and accumulate operation, accumulation can be performed with signed saturation as shown below and SIMD saturation history may be stored according to which result data saturate. For word result data:

```
Operand 1221 ←(x=1)? wRn[half 1]: wRn[half 0]
Operand 1243 ←(x=1)? wRn[half 3]: wRn[half 2]
Operand 1265 ←(y=1)? wRm[half 1]: wRm[half 0]
Operand 1278 ←(y=1)? wRm[half 3]: wRm[half 2]
If (Operand 1221= Operand 1265=0x8000) then
    Temp1233 ←0x7FFFFFFF;
Else
    Temp1233 ←(Operand 1221 * Operand 1265) << 1;
If (Operand 1243= Operand 1278=0x8000) then
    Temp1234 ←0x7FFFFFFF;
Else
    Temp1234 ←(Operand 1243 * Operand 1278) << 1;
If (N specified) then {
wRd[word 1] ←saturate(wRd[word 1] – Temp1234, S, 32);
wCSSF[bit 7] ←(wRd[word 1] ≠ (wRd[word 1] – Temp1234) ) |
  wCSSF[bit 7];
wRd[word 0] ←saturate(wRd[word 0] – Temp1233, S, 32);
wCSSF[bit 3] ←(wRd[word 0] ≠ (wRd[word 0] – Temp1233) ) |
  wCSSF[bit 3];
}
Else {
wRd[word 1] ←saturate(wRd[word 1] + Temp1234, S, 32);
wCSSF[bit 7] ←(wRd[word 1] ≠ (wRd[word 1] + Temp1234) ) |
  wCSSF[bit 7];
wRd[word 0] ←saturate(wRd[word 0] + Temp1233, S, 32);
wCSSF[bit 3] ←(wRd[word 0] ≠ (wRd[word 0] + Temp1233) ) |
  wCSSF[bit 3];
}
```

For one alternative embodiment of the SIMD fraction multiply or multiply-negate and accumulate operation, multiplication and accumulation can be performed together with signed saturation or unsigned saturation.

It will be appreciated that a SIMD fraction multiply or multiply-negate and accumulate operation may provide for bit-exact implementations of voice codecs such as those used by the Global System for Mobil Communications (GSM*, a registered trademark of the GSM Association), for example, in cellular systems.

Figure 13:
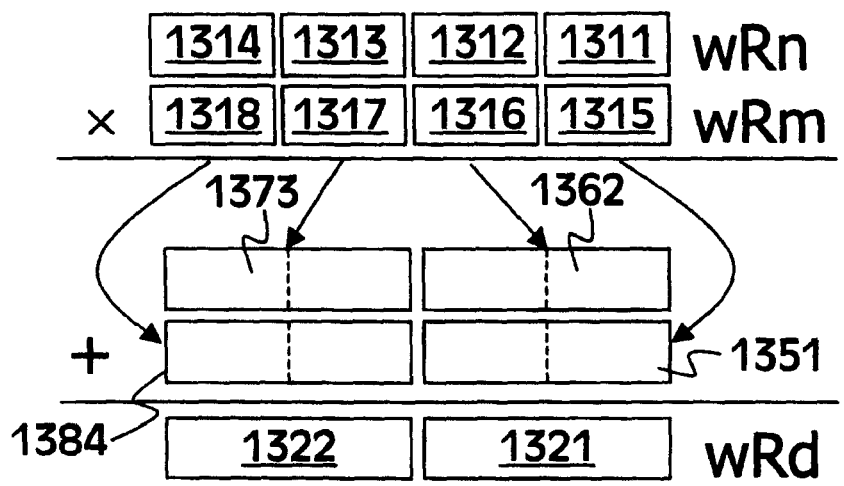
FIG. 13 illustrates another alternative embodiment of a SIMD operation, which may store SIMD saturation history.

FIG. 13 illustrates another alternative embodiment of a SIMD multiply and add operation, which may store SIMD saturation history. The multiply and add instruction performs multiplication of 16-bit source data of register wRn and 16-bit source data of register wRm. The intermediate products of the multiplications are added together in pairs to produce packed 32-bit sums, which are stored in destination register wRd.

For one alternative embodiment (not illustrated by FIG. 13) the instruction optionally negates the most significant intermediate product of each pair as the pairs are added to produce packed 32-bit differences, which are stored in destination register wRd. For other alternative embodiments of the multiply and add operation, saturation can be specified as signed or unsigned, or no saturation is applied.

An operation encoding for one embodiment of the SIMD multiply and add operation may be summarized as shown in Table 9.

TABLE 9

| 31-28 | 27-24 | 23-20 | 19-16 | 15-12 | 11-8 | 7-5 | 4 | 3-0 |
|---|---|---|---|---|---|---|---|---|
| Cond | 1110 | nns0 | wRn | wRd | 0001 | sss | 0 | wRm |

For one alternative embodiment of the multiply and add operation, the values in bit positions 23-22 determine whether a multiply and add (nn=10) or a multiply and subtract (nn=11) operation will be preformed. The values in bit positions 21 and 7-5 determine whether one of signed arithmetic with saturation, signed arithmetic without saturation, unsigned arithmetic with saturation or unsigned arithmetic without saturation will be performed. Saturation is performed to the result data size of 32-bits.

For example, one embodiment of a SIMD multiply and add operation is illustrated in FIG. 13. Source register wRn contains half word data 1314-1311. Source register wRm contains half word data 1318-1315. Multiplication operands 1314 and 1318 are multiplied together to produce intermediate result 1384 and multiplication operands 1313 and 1317 are multiplied together to produce intermediate result 1373. Intermediate results 1384 and 1373 are added, optionally with saturation, to produce the word result 1322. Multiplication operands 1312 and 1316 are multiplied together to produce intermediate result 1362 and multiplication operands 1311 and 1315 are multiplied together to produce intermediate result 1351. Intermediate results 1362 and 1351 are added, optionally with saturation, to produce the word result 1321. The two word results 1322 and 1321 are stored in destination register wRd.

For one embodiment of the SIMD multiply and add operation, addition or subtraction of products can be performed with signed or unsigned saturation as shown below and SIMD saturation history may be stored according to which result data saturate. For word result data:

```
Temp1351 ←wRn[half 0] * wRm[half 0];
Temp1362 ←wRn[half 1] * wRm[half 1];
Temp1373 ←wRn[half 2] * wRm[half 2];
Temp1384 ←wRn[half 3] * wRm[half 3];
If (nn = 11) then {
    wRd[word 1] ←saturate(Temp1373 − Temp1384, {US,SS}, 32);
    wCSSF[bit 7] ←(wRd[word 1] ≠ (Temp1373 − Temp1384) ) |
    wCSSF[bit 7];
    wRd[word 0] ←saturate(Temp1351 − Temp1362, {US,SS}, 32);
    wCSSF[bit 3] ←(wRd[word 0] ≠ (Temp1351 − Temp1362) ) |
    wCSSF[bit 3];
}
Else If (nn = 10) then {
    wRd[word 1] ←saturate(Temp1373 + Temp1384, {US,SS}, 32);
    wCSSF[bit 7] ←(wRd[word 1] ≠ (Temp1373 + Temp1384) ) |
    wCSSF[bit 7];
    wRd[word 0] ←saturate(Temp1351 + Temp1362, {US,SS}, 32);
    wCSSF[bit 3] ←(wRd[word 0] ≠ (Temp1351 + Temp1362) ) |
    wCSSF[bit 3];
}
```

For one alternative embodiment of the SIMD multiply and add operation, multiplication and addition can be performed together with signed, unsigned or no saturation.

Figure 14:
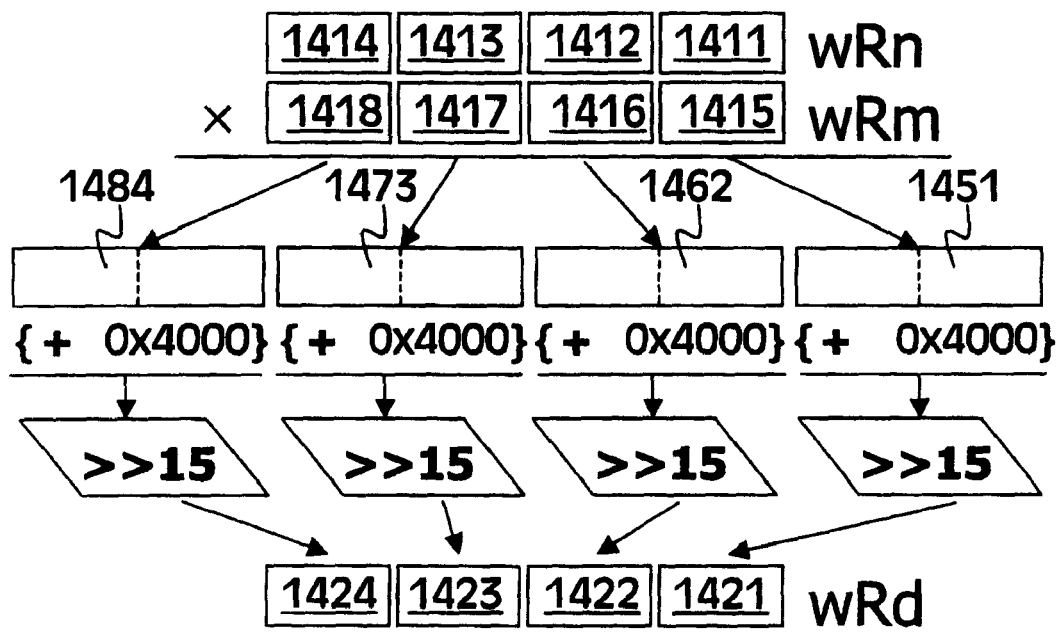
FIG. 14 illustrates another alternative embodiment of a SIMD operation, which may store SIMD saturation history.

For another alternative embodiment of the SIMD multiply and add operation, operands may be cross multiplied and addition performed with signed or unsigned saturation as shown below with SIMD saturation history stored according to which result data saturate. For word result data:
Temp1361←wRn[half 0]*wRm[half 1];
Temp1352←wRn[half 1]*wRm[half 0];
Temp1383←wRn[half 2]*wRm[half 3];
Temp1374←wRn[half 3]*wRm[half 2];
wRd[word 1]←saturate(Temp1383+Temp1374, {US, SS}, 32);
wCSSF[bit 7]←wRd[word 1]≠(Temp1383+Temp1374))|wCSSF[bit 7];
wRd[word 0]←saturate(Temp1361+Temp1352, {US, SS}, 32);
wCSSF[bit 3]←wRd[word 0]≠(Temp1361+Temp1352))|wCSSF[bit 3];

FIG. 14 illustrates another alternative embodiment of a SIMD fractional multiply operation, which may store SIMD saturation history. One embodiment of the fractional multiply instruction performs multiplication of 16-bit source data of register wRn and 16-bit source data of register wRm. The upper 17-bits of 32-bit intermediate products of the multiplications are optionally rounded (for example, by adding a 1 to the 18$^{th}$ bit, bit 14) and saturated to 16 bits, which are stored in destination register wRd. For alternative embodiments, 18 or more bits are optionally rounded and saturated to 16 or less bits, which are stored in destination register wRd.

An alternative embodiment of the fractional multiply instruction performs multiplication of 32-bit source data of register wRn and 32-bit source data of register wRm. The upper 33-bits of 64-bit intermediate products of the multiplications are optionally rounded (for example, by adding a 1 to the 34$^{th}$ bit, bit 30) and saturated to 32-bits, which are stored in destination register wRd. For alternative embodiments, 34 or more bits are optionally rounded and saturated to 32 or less bits, which are stored in destination register wRd.

For one embodiment of the fractional multiply operation, signed saturation occurs when both 16-bit source operands or both 32-bit source operands are equal to the most negative signed representation, hexadecimal 0x8000 or hexadecimal 0x80000000 respectively. For alternative embodiments saturation may occur for a variety of combinations of source operand values. For one alternative embodiment of the fractional multiply operation, saturation can be specified as signed, unsigned, or no saturation.

An operation encoding for one embodiment of the SIMD fractional multiply operation may be summarized as shown in Table 10.

TABLE 10

| 31-28 | 27-24 | 23-20 | 19-16 | 15-12 | 11-8 | 7-5 | 4 | 3-0 |
|---|---|---|---|---|---|---|---|---|
| Cond | 1110 | ssrs | wRn | wRd | 0000 | sss | 0 | wRm |

For one alternative embodiment of the fractional multiply operation, the values in bit position 21 determine whether a rounding will be preformed. The values in bit positions 23-22, 20 and 7-5 determine whether 16-bit or 32-bit signed multiplication and saturation will be performed. For one embodiment of the SIMD fractional multiply operation, bit positions 23-22, 20 and 7-5 are set to binary values of 00, 1 and 100 respectively and saturation is performed to the result data size of 16-bits. For one alternative embodiment of the SIMD fractional multiply operation, bit positions 23-22, 20 and 7-5 are set to binary values of 11, 0 and 111 respectively and saturation is performed to the result data size of 32-bits.

For example, one embodiment of a half word SIMD fractional multiply operation is illustrated in FIG. 14. Source register wRn contains half word data 1414-1411. Source register wRm contains half word data 1418-1415. Multiplication operands 1414 and 1418 are multiplied together to produce intermediate product 1484, multiplication operands 1413 and 1417 are multiplied together to produce intermediate product 1473, multiplication operands 1412 and 1416 are multiplied together to produce intermediate product 1462, and multiplication operands 1411 and 1415 are multiplied together to produce intermediate product 1451. The upper 17-bits of intermediate products 1484, 1473, 1462 and 1451 are optionally rounded by adding to each a hexadecimal value of 0x4000, which has a 1 in the 18$^{th}$ bit (bit 14). They are shifted right 15 bit positions and saturated to 16-bit signed values. The four half word results 1424-1411 are stored in destination register wRd.

For one embodiment of the SIMD fractional multiply operation, multiplication and optional rounding of products can be performed with signed saturation as shown below and SIMD saturation history may be stored according to which result data saturate. For half word result data:

```
Temp1451 ←wRn[half 0] * wRm[half 0];
Temp1462 ←wRn[half 1] * wRm[half 1];
Temp1473 ←wRn[half 2] * wRm[half 2];
Temp1484 ←wRn[half 3] * wRm[half 3];
If (R specified) then {
    wRd[half 3] ←saturate((Temp1484 + 0x4000) >>15, SS, 16);
    wCSSF[bit 7] ←(wRd[half 3] ≠ ((Temp1484 + 0x4000) >>15) ) |
        wCSSF[bit 7];
    wRd[half 2] ←saturate((Temp1473 + 0x4000) >>15, SS, 16);
    wCSSF[bit 5] ←(wRd[half 2] ≠ ((Temp1473 + 0x4000) >>15) ) |
        wCSSF[bit 5];
    wRd[half 1] ←saturate((Temp1462 + 0x4000) >>15, SS, 16);
    wCSSF[bit 3] ←(wRd[half 1] ≠ ((Temp1462 + 0x4000) >>15) ) |
        wCSSF[bit 3];
    wRd[half 0] ←saturate((Temp1451 + 0x4000) >>15, SS, 16);
    wCSSF[bit 1] ←(wRd[half 0] ≠ ((Temp1451 + 0x4000) >>15) ) |
        wCSSF[bit 1];
}
Else {
    wRd[half 3] ←saturate(Temp1484 >>15, SS, 16);
    wCSSF[bit 7] ←(wRd[half 3] ≠ (Temp1484 >>15) ) | wCSSF[bit 7];
    wRd[half 2] ←saturate(Temp1473 >>15, SS, 16);
    wCSSF[bit 5] ←(wRd[half 2] ≠ (Temp1473 >>15) ) | wCSSF[bit 5];
    wRd[half 1] ←saturate(Temp1462 >>15, SS, 16);
    wCSSF[bit 3] ←(wRd[half 1] ≠ (Temp1462 >>15) ) | wCSSF[bit 3];
    wRd[half 0] ←saturate(Temp1451 >>15, SS, 16);
    wCSSF[bit 1] ←(wRd[half 0] ≠ (Temp1451 >>15) ) | wCSSF[bit 1];
}
```

For word result data:

```
Temp1431 ←wRn[word 0] * wRm[word 0];
Temp1442 ←wRn[word 1] * wRm[word 1];
If (R specified) then {
    wRd[word 1] ←saturate((Temp1442 + 0x40000000) >>31, SS, 32);
    wCSSF[bit 7] ←(wRd[word 1] ≠ ((Temp1442 + 0x40000000) >>31) )
        | wCSSF[bit 7];
    wRd[word 0] ←saturate((Temp1431 + 0x40000000) >>31, SS, 32);
    wCSSF[bit 3] ←(wRd[word 0] ≠ ((Temp1431 + 0x40000000) >>31) )
        | wCSSF[bit 3];
}
Else {
    wRd[word 1] ←saturate(Temp1442 >>31, SS, 32);
    wCSSF[bit 7] ←(wRd[word 1] ≠ (Temp1442 >>31) ) | wCSSF[bit 7];
    wRd[word 0] ←saturate(Temp1431 >>31, SS, 32);
    wCSSF[bit 3] ←(wRd[word 0] ≠ (Temp1431 >>31) ) | wCSSF[bit 3];
}
```

For one alternative embodiment of the SIMD fractional multiply operation, fractional multiplication can be performed together with signed, unsigned or no saturation.

Figure 15:
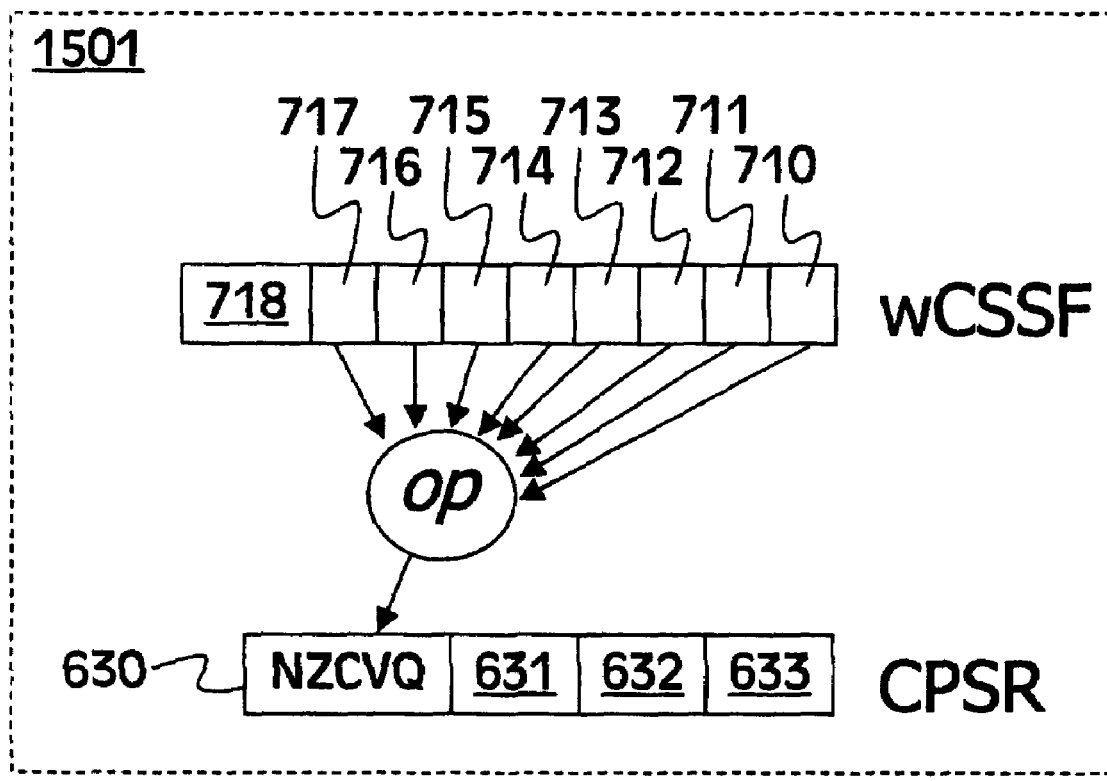
FIG. 15 illustrates one embodiment of an operation for processing SIMD saturation history.

FIG. 15 illustrates one embodiment of an operation 1501 for processing SIMD saturation history. The instruction for operation 1501 performs one or more operations (op) on data from SIMD fields 717-710 and stores a result in condition code flags set 630 of the CPSR. The result of operation 1501 may provide for conditional execution or group conditional execution of instructions based on saturation history.

For one embodiment of operation 1501 the data from all of the SIMD fields 717-710 is logically combined by an OR operation and the combined result is written to the overflow (V) flag in condition code flags set 630 of the CPSR. For an alternative embodiment of operation 1501 data is selected from one specific field of the SIMD fields 717-710 and written to the overflow (V) flag in condition code flags set 630 of the CPSR. For another alternative embodiment of operation 1501, data is written to the saturation (Q) flag in condition code flags set 630 of the CPSR. For another alternative embodiment of operation 1501, data from SIMD fields 717-710 is logically combined by an AND operation. For another alternative embodiment of operation 1501, data from SIMD fields 717-710 is counted and compared to a threshold value.

An operation encoding for one embodiment of operation 1501 may be summarized as shown in Table 11.

TABLE 11

| 31-28 | 27-24 | 23-21 | 20 | 19-16 | 15-12 | 11-8 | 7-5 | 4 | 3-0 |
|---|---|---|---|---|---|---|---|---|---|
| Cond | 1110 | ww0 | 1 | 0011 | 1111 | 0001 | 010 | 1 | 0000 |

For one embodiment of operation 1501, the values in bit positions 23 and 22 select which SIMD fields 717-710 to use in performing said one or more operations (op). For example: SIMD fields 717 and 713 (word saturation history) may be selected by a value of 10, SIMD fields 717 715, 713 and 711 (half word saturation history) may be selected by a value of 01, and all SIMD fields 717-710 (byte saturation history) may be selected by a value of 00.

For one embodiment of operation 1501, one or more operations can be performed on data selected from SIMD fields 717-710 and results may be stored in condition code flags set 630 of the CPSR as shown below.

```
If (byte history is specified) then {
    CPSR[bits 31-29] ←000;
    CPSR[bit 28] ←wCSSF[bit 7] | wCSSF[bit 6] | wCSSF[bit 5] |
        wCSSF[bit 4] | wCSSF[bit 3] | wCSSF[bit 2] | wCSSF[bit 1] |
        wCSSF[bit 0];
}
If (half word history is specified) then {
    CPSR[bits 31-29] ←000;
    CPSR[bit 28] ←wCSSF[bit 7] | wCSSF[bit 5] | wCSSF[bit 3] |
        wCSSF[bit 1];
}
Else if (word history is specified) then {
    CPSR[bits 31-29] ←000;
    CPSR[bit 28] ←wCSSF[bit 7] | wCSSF[bit 3];
}
```

It will be appreciated that the above illustrated operations, encodings and formats may be modified in arrangement and detail by those skilled in the art without departing from the principles herein disclosed and claimed.

Figure 16:
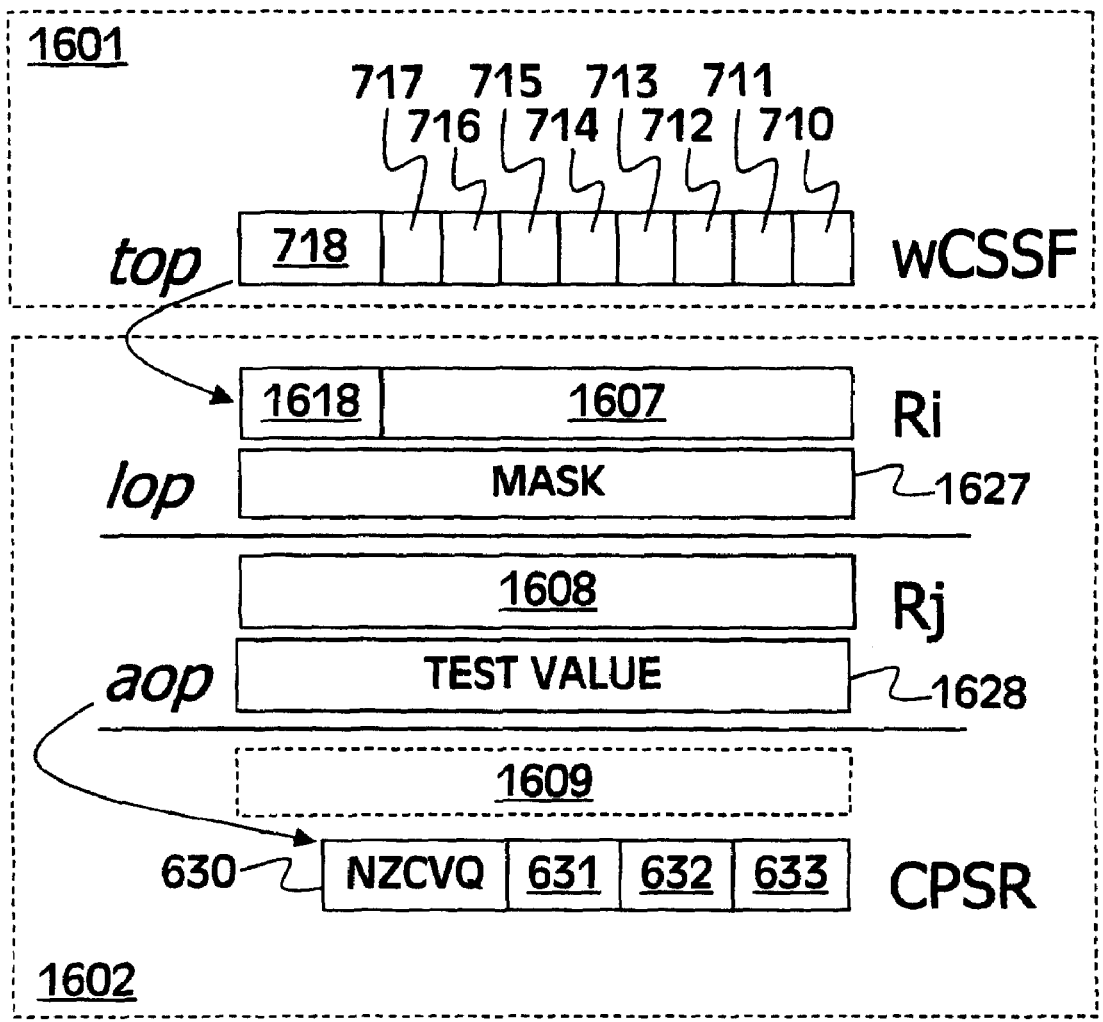
FIG. 16 illustrates one alternative embodiment of a sequence of operations for processing SIMD saturation history.

FIG. 16 illustrates one alternative embodiment of a sequence of operations 1601 and 1602 for processing SIMD saturation history. Operation 1601 comprises a transfer operation (top) to move data form one or more SIMD fields 717-710 to a field 1607 in register Ri. Operation 1602 comprises an arithmetic/logical operation (aop) to process SIMD saturation history data and to store a result in condition code flags set 630 of the CPSR. For one embodiment of operation 1602, arithmetic/logical operation (aop) performs a comparison of the SIMD saturation history data with a test value 1628. For an alternative embodiment of operation 1602, arithmetic/logical operation (aop) performs a subtraction of test value 1628 from the SIMD saturation history data. For one embodiment of operation 1602, arithmetic/logical operation (aop) also stores a result in register 1609. For one embodiment of operation 1602, SIMD saturation history data 1608 in register Rj comprises the data of field 1607 in register Ri. For one embodiment of operation 1602, register Rj is register Ri.

For one embodiment of operation 1601, data from reserved field 718 is transferred to field 1618 in register Ri. One alternative embodiment of operation 1602 further comprises logical operation (lop) to process SIMD saturation history data from the one or more SIMD fields 717-710 with mask 1627 and to store SIMD saturation history data 1608 in register Rj as an input operand for arithmetic/logical operation (aop).

It will be appreciated that for various embodiments of operation 1602, multiple various flags of condition code flags set 630 may be affected in the CPSR.

Figure 17:
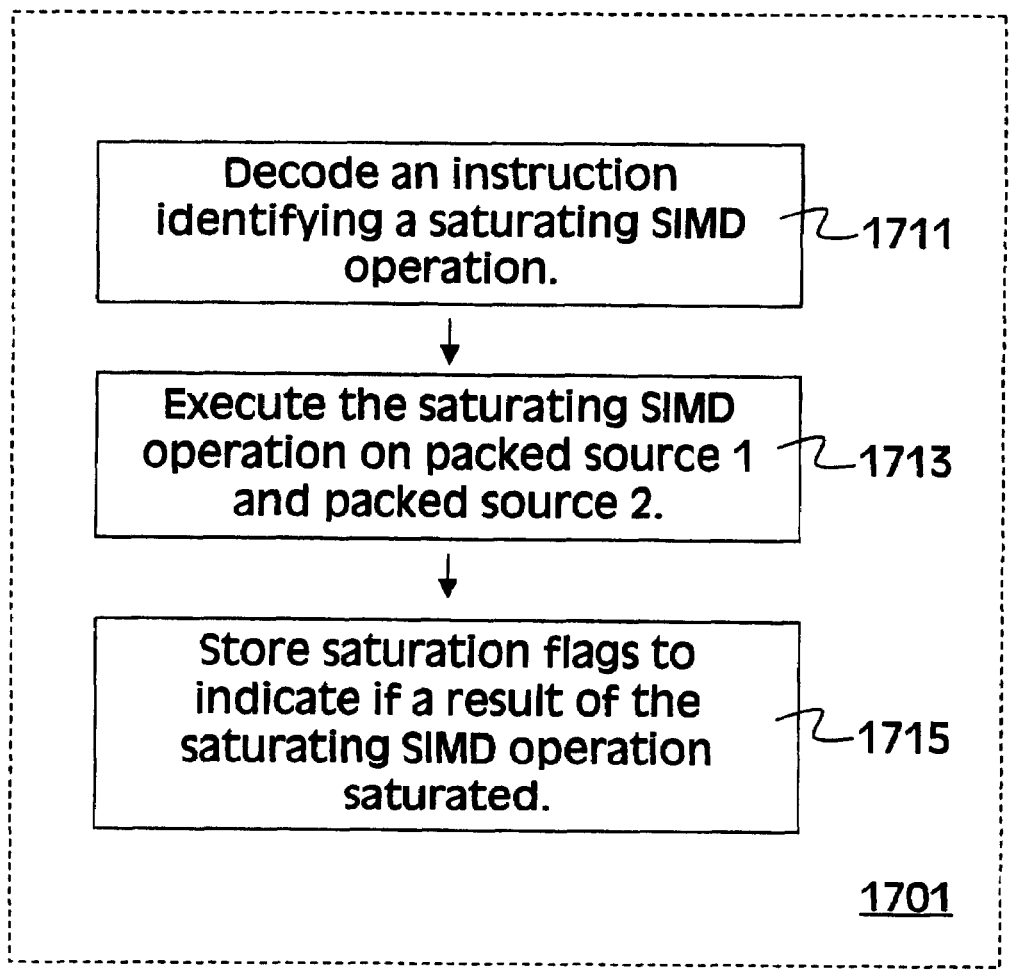
FIG. 17 illustrates a flow diagram for one embodiment of a process to generate and store SIMD saturation history.

FIG. 17 illustrates a flow diagram for one embodiment of a process to generate and store SIMD saturation history. Process 1701 and other processes herein disclosed are performed by processing blocks that may comprise dedicated hardware or software or firmware operation codes executable by general purpose machines or by special purpose machines or by a combination of both.

In processing block 1711 a coprocessor instruction is decoded identifying a saturating SIMD operation. Processing continues in processing block 1713 where the saturating SIMD operation is executed on a packed source 1 and a packed source 2. Processing continues in processing block 1715 where saturation flags are stored to indicate if a result of the saturating SIMD operation saturated.

Figure 18:
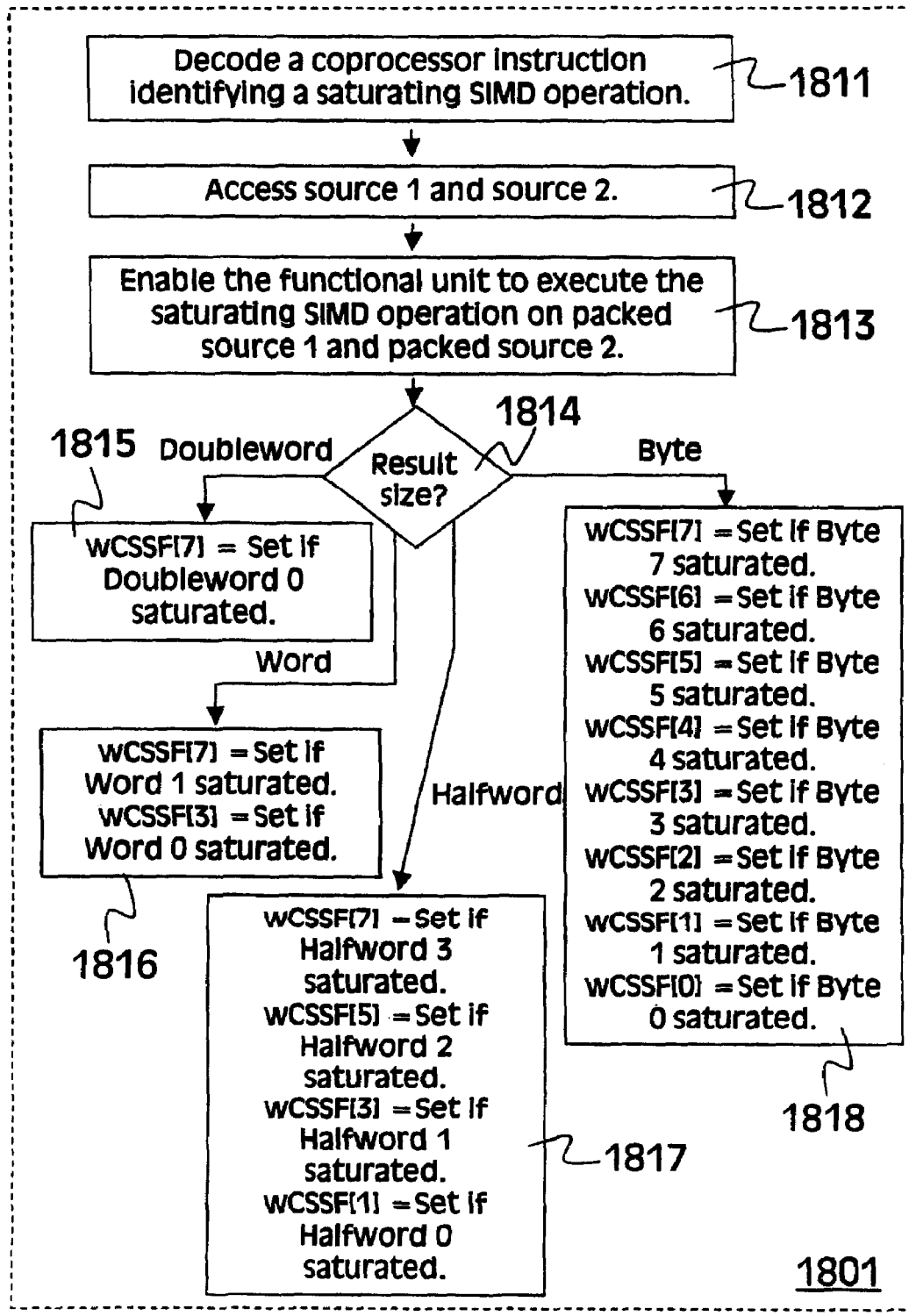
FIG. 18 illustrates a flow diagram for an alternative embodiment of a process to generate and store SIMD saturation history.

FIG. 18 illustrates a flow diagram for an alternative embodiment of a process to generate and store SIMD saturation history. In processing block 1811 a coprocessor instruction is decoded identifying a saturating SIMD operation. Processing continues in processing block 1812 where a source 1 and a source 2 are accessed. Processing continues in processing block 1813 where the functional unit is enabled to execute the saturating SIMD operation on packed data of source 1 and packed data of source 2. Processing continues in processing block 1814 where the size of the result data is identified.

If the result data are double words then processing continues in processing block 1815 where wCSSF[7] is set if the double word 0 result of the saturating SIMD operation saturated. If the result data are words then processing continues in processing block 1816 where wCSSF[7] is set if the word 1 result of the saturating SIMD operation saturated and wCSSF[3] is set if the word 0 result of the saturating SIMD operation saturated. If the result data are half words then processing continues in processing block 1817 where wCSSF[7] is set if the half word 3 result of the saturating SIMD operation saturated, wCSSF[5] is set if the half word 2 result of the saturating SIMD operation saturated, wCSSF[3] is set if the half word 1 result of the saturating SIMD operation saturated and wCSSF[1] is set if the half word 0 result of the saturating SIMD operation saturated. If the result data are bytes then processing continues in processing block 1818 where wCSSF[7] is set if the byte 7 result of the saturating SIMD operation saturated, wCSSF[6] is set if the byte 6 result saturated, wCSSF[5] is set if the byte 5 result saturated, wCSSF[4] is set if the byte 4 result saturated, wCSSF[3] is set if the byte 3 result saturated, wCSSF[2] is set if the byte 2 result saturated, wCSSF[1] is set if the byte 1 result saturated and wCSSF[0] is set if the byte 0 result of the saturating SIMD operation saturated.

It will be appreciated that process 1801 may store saturation history to other locations and/or to different sized fields without departing from the spirit of process 1801. It will also be appreciated that individual or combined SIMD saturation history may be used for conditional execution of subsequent instructions or of operations of subsequent instructions. It will also be appreciated that individual or combined SIMD saturation history may also be used for conditional selection and/or storage of data by subsequent instructions.

The above description is intended to illustrate preferred embodiments of the present invention. From the discussion above it should also be apparent that especially in such an area of technology, where growth is fast and further advancements are not easily foreseen, the invention may be modified in arrangement and detail by those skilled in the art without departing from the principles of the present invention within the scope of the accompanying claims and their equivalents.

What is claimed is:

1. A method comprising:
    decoding a fractional multiply operation that specifies a first operand and a second operand both stored in a first source register, and a third operand and a fourth operand both stored in a second source register;
    executing a first multiply operation on the first and third operands pursuant to the fractional multiply operation to generate a first intermediate product;
    executing a second multiply operation on the second and fourth operands pursuant to the fractional multiply operation to generate a second intermediate product;
    shifting the first intermediate product and the second intermediate by a predetermined number of bit positions;
    saturating the shifted first and second intermediate products to n-bit width specified by the fractional multiply operation;
    storing the saturated first and second intermediate products in a destination register and a saturation history according to whether saturation has occurred at a particular byte, half-word, or word position in a saturation history field of a saturation flag register;
    processing the saturation history and storing a result of the processing in a condition code flags set indicating negative, zero, carry out, overflow, and optional saturation; and
    executing subsequent operations conditioned upon the condition code flags set.

2. The method according to claim 1, further comprising:
    rounding the first intermediate product and the second intermediate product before the shifting by adding a rounding value to the first intermediate product and to the second intermediate product when the fractional multiply operation specifies that a rounding should be performed.

3. The method according to claim 2, wherein the first, second, third and fourth operands are each 32-bit operands, and the predetermined number of bit positions in the shifting is 31.

4. The method according to claim 2, wherein the first, second, third and fourth operands are each 16-bit operands and the predetermined number of bit positions in the shifting is 15.

5. The method according to claim 4, wherein the fractional multiply operation specifies a fifth operand and a sixth operand both stored in the first source register, and a seventh operand and an eighth operand both stored in the second source register, the method further comprising:
    executing a third multiply operation on the fifth and seventh operands to generate a third intermediate product;
    executing a fourth multiply operation on the sixth and eighth operands to generate a fourth intermediate product;
    rounding the third and fourth intermediate products by adding a rounding value to the third intermediate product and to the fourth intermediate product when the fractional multiply operation specifies that another rounding should be performed;
    shifting the third intermediate product and the fourth intermediate product by the predetermined number of bit positions; and storing the shifted third and fourth intermediate products in the destination register.

6. The method according to claim 1, further comprising:
storing saturation history in a saturation status flag register according to which of the first and second intermediate products saturate.

7. An apparatus comprising:
a coprocessor interface unit that is configured to identify an instruction for a fractional multiply operation, the fractional multiply operation specifying a first operand, a second operand, a third operand and a fourth operand;
a register file unit; and
an execution unit that is configured to perform the fractional multiply operation by:
executing a first multiply operation on the first and third operands pursuant to the fractional multiply operation to generate a first intermediate product;
executing a second multiply operation on the second and fourth operands pursuant to the fractional multiply operation to generate a second intermediate product;
shifting the first intermediate product and the second intermediate product by a predetermined number of bit positions;
saturating the shifted first and second intermediate products to n-bit width specified by the fractional multiply operation;
storing the saturated first and second intermediate products in a destination register of the register file unit and a saturation history according to whether saturation has occurred at a particular byte, half-word, or word position in a saturation history field of a saturation flag register;
processing the saturation history and storing a result of the processing in a condition code flags set indicating negative, zero, carry out, overflow, and optional saturation; and
executing subsequent operations conditioned upon the condition code flags set.

8. The apparatus according to claim 7, wherein the execution unit performs the fractional multiply operation by rounding the first intermediate product and the second intermediate product, before shifting the first intermediate product and the second intermediate product, by adding a rounding value to the first intermediate product and to the second intermediate product when the fractional multiply operation specifies that a rounding should be performed.

9. The apparatus according to claim 8, wherein the first, second, third and fourth operands are each 32-bit operands, and the predetermined number of bit positions in the shifting is 31.

10. The apparatus according to claim 8, wherein the first, second, third and fourth operands are each 16-bit operands, and the predetermined number of bit positions in the shifting is 15.

11. The apparatus according to claim 10, wherein
the fractional multiply operation identifies a fifth operand, a sixth operand, a seventh operand and an eighth operand, and
the execution unit performs the fractional multiply operation by:
executing a third multiply operation on the fifth and seventh operands to generate a third intermediate product;
executing a fourth multiply operation on the sixth and eighth operands to generate a fourth intermediate product;
rounding the third and fourth intermediate products by adding a rounding value to the third intermediate product and to the fourth intermediate product when the fractional multiply operation specifies that a rounding should be performed;
shifting the third intermediate product and the fourth intermediate product by the predetermined number of bit positions; and
storing the shifted third and fourth intermediate products in the destination register.

12. The apparatus according to claim 8, wherein the execution unit performs the fractional multiply operation by:
storing saturation history in a saturation status flag register of the register file unit according to which of the first and second intermediate products saturate.

13. A data processing system comprising:
an addressable memory to store a plurality of instructions including instructions for SIMD operations; and
a processing core including:
an execution core that is configured to access a fractional multiply instruction for a SIMD fractional multiply operation stored by the addressable memory;
a first source register to store a first operand and a second operand;
a second source register to store a third operand and a fourth operand;
a destination register; and
a coprocessor that is configured to perform the SIMD fractional multiply operation by:
executing a first multiply operation on the first and third operands pursuant to the SIMD fractional multiply operation to generate a first intermediate product;
executing a second multiply operation on the second and fourth operands pursuant to the SIMD fractional multiply operation to generate a second intermediate product;
shifting the first intermediate product and the second intermediate product by a predetermined number of bit positions;
saturating the shifted first and second intermediate products to n-bit width specified by the SIMD fractional multiply operation;
storing the saturated first and second intermediate products in the destination register and a saturation history according to whether saturation has occurred at a particular byte, half-word, or word position in a saturation history field of a saturation flag register;
processing the saturation history and storing a result of the processing in a condition code flags set indicating negative, zero, carry out, overflow, and optional saturation; and
executing subsequent operations conditioned upon the condition code flags set.

14. The data processing system according to claim 13, further comprising:
a wireless interface to receive a digital data signal; and
an I/O system to provide at least the first and second operands to the processing core from the digital data signal.

15. The data processing system according to claim 13, wherein the coprocessor performs the SIMD fractional multiply operation by rounding the first intermediate product and the second intermediate product before the shifting by adding a rounding value to the first intermediate product and to the second intermediate product when the SIMD fractional multiply operation specifies that a rounding should be performed.

16. The data processing system according to claim 15, wherein the first, second, third and fourth operands are each 32-bit operands, and the predetermined number of bit positions in the shifting is 31.

17. The data processing system according to claim 15, wherein the first, second, third and fourth operands are each 16-bit operands, and the predetermined number of bit positions in the shifting is 15.

18. The data processing system according to claim 17, wherein the first source register stores a fifth operand and a sixth operand, the second source register stores a seventh operand and an eighth operand, and the coprocessor performs the SIMD fractional multiply operation by:

executing a third multiply operation on the fifth and seventh operands to generate a third intermediate product;

executing a fourth multiply operation on the sixth and eighth operands to generate a fourth intermediate product;

rounding the third and fourth intermediate products by adding a rounding value to the third intermediate product and to the fourth intermediate product when the SIMD fractional multiply operation specifies that another rounding should be performed;

shifting the third intermediate product and the fourth intermediate product by the predetermined number of bit positions; and storing the shifted third and fourth intermediate products in the destination register.

19. The data processing system according to claim 13, the processing core further including a saturation status flag register, wherein the execution core performs the SIMD fractional multiply operation by:

storing saturation history in the saturation status flag register according to which of the first and second intermediate products saturate.

\* \* \* \* \*